(12) United States Patent  
Valencia et al.

(10) Patent No.: US 12,314,794 B2
(45) Date of Patent: May 27, 2025

(54) OBJECT MONITORING

(71) Applicant: Commonwealth Scientific and Industrial Research Organisation, Acton (AU)

(72) Inventors: Philip Juan Valencia, Acton (AU); Nicholas Alexander Heaney, Acton (AU)

(73) Assignee: Commonwealth Scientific and Industrial Research Organisation, Acton (AU)

( * ) Notice: Subject to any disclaimer, the term of this patent is extended or adjusted under 35 U.S.C. 154(b) by 376 days.

(21) Appl. No.: 17/636,501

(22) PCT Filed: Aug. 25, 2020

(86) PCT No.: PCT/AU2020/050891
§ 371 (c)(1),
(2) Date: Feb. 18, 2022

(87) PCT Pub. No.: WO2021/035297
PCT Pub. Date: Mar. 4, 2021

(65) Prior Publication Data
US 2022/0269920 A1    Aug. 25, 2022

(30) Foreign Application Priority Data

Aug. 30, 2019   (AU) .................................. 2019903196

(51) Int. Cl.
*G06K 19/07* (2006.01)
*G16Y 20/10* (2020.01)
(Continued)

(52) U.S. Cl.
CPC .......... *G06K 19/0723* (2013.01); *G16Y 20/10* (2020.01); *G16Y 20/20* (2020.01);
(Continued)

(58) Field of Classification Search
CPC .... G06K 19/0723; G16Y 20/10; G16Y 20/20; H04W 4/025; H04W 4/029
See application file for complete search history.

(56) References Cited

U.S. PATENT DOCUMENTS 7,619,523 B2    11/2009   Dutschi et al.
8,989,053 B1    3/2015    Skaaksrud et al.
(Continued)

FOREIGN PATENT DOCUMENTS

JP    2002-358591 A    12/2002
JP    2007-249751 A    9/2007
(Continued)

OTHER PUBLICATIONS

Liu et al., "Ambient Backscatter: Wireless Communication Out of Thin Air", ACM SIGCOMM Computer Communication Review 43.4, pp. 39-50, 2013.
(Continued)

*Primary Examiner* — Fekadeselassie Girma
(74) *Attorney, Agent, or Firm* — Merchant & Gould P.C.

(57) ABSTRACT

An object monitoring system including a plurality of tags, each tag being associated with a respective object in use and including a tag transceiver configured to transmit or receive messages and a tag processing device. The tag processing device is configured to determine context data indicative of a context associated with the object and/or other objects and generate tag history data indicative of an object type identifier indicative of an object type of the respective object and at least some context data for a time period. One or more processing devices are configured to analyse tag history data so that results of the analysis can be used to predict trigger events.

17 Claims, 12 Drawing Sheets

(51) Int. Cl.
*G16Y 20/20* (2020.01)
*H04W 4/02* (2018.01)
*H04W 4/029* (2018.01)
*H04W 4/38* (2018.01)

(52) U.S. Cl.
CPC ........... *H04W 4/025* (2013.01); *H04W 4/029* (2018.02); *H04W 4/38* (2018.02)

(56) References Cited

U.S. PATENT DOCUMENTS

| | | |
|---|---|---|
| 9,823,342 B2 | 11/2017 | Cook et al. |
| 9,824,571 B2 | 11/2017 | Sedayao et al. |
| 10,033,594 B2 | 7/2018 | Skaaksrud et al. |
| 10,304,304 B1* | 5/2019 | Miller .................. G06K 7/0008 |
| 2003/0139968 A1 | 7/2003 | Ebert |
| 2003/0144985 A1* | 7/2003 | Ebert ..................... G06Q 10/08 707/999.001 |
| 2004/0008112 A1 | 1/2004 | Carrender |
| 2006/0082444 A1* | 4/2006 | Sweeney, II ............. G07C 9/28 340/10.3 |
| 2006/0261946 A1 | 11/2006 | Himberger et al. |
| 2007/0112574 A1 | 5/2007 | Greene |
| 2008/0157970 A1 | 7/2008 | Single et al. |
| 2008/0205886 A1 | 8/2008 | Anderson et al. |
| 2009/0125283 A1 | 5/2009 | Conover |
| 2010/0121668 A1 | 5/2010 | Hohmann |
| 2011/0050423 A1* | 3/2011 | Cova ..................... G06Q 10/08 705/333 |
| 2012/0229259 A1 | 9/2012 | Maltseff et al. |
| 2013/0198094 A1 | 8/2013 | Arazy |
| 2013/0229263 A1* | 9/2013 | Graczyk ................. G08C 23/04 340/10.1 |
| 2014/0136188 A1* | 5/2014 | Wroczynski .......... G06F 40/284 704/9 |
| 2014/0379386 A1* | 12/2014 | Drennan, III .......... G06Q 10/10 705/4 |
| 2015/0221052 A1* | 8/2015 | Messing ................. G06Q 50/18 705/311 |
| 2015/0359127 A1* | 12/2015 | Daoura .................. G08B 21/24 361/752 |
| 2016/0086228 A1 | 3/2016 | Babb et al. |
| 2016/0103823 A1 | 4/2016 | Jackson et al. |
| 2016/0110975 A1 | 4/2016 | Oppenheimer |
| 2016/0183042 A1* | 6/2016 | Weizman ................ H04W 4/02 455/456.1 |
| 2016/0212579 A1* | 7/2016 | Duan ...................... H04W 4/90 |
| 2016/0321582 A1* | 11/2016 | Broudou ................ G06N 20/00 |
| 2016/0350359 A1 | 12/2016 | Kim et al. |
| 2016/0352778 A1 | 12/2016 | Chari et al. |
| 2017/0012813 A1* | 1/2017 | Skaaksrud ........... H04B 17/318 |
| 2017/0041452 A1* | 2/2017 | Amann .................. H04W 4/70 |
| 2017/0046945 A1* | 2/2017 | Englot ................... G08B 21/14 |
| 2017/0060574 A1 | 3/2017 | Malladi et al. |

FOREIGN PATENT DOCUMENTS

| | | |
|---|---|---|
| JP | 2009-294226 A | 12/2009 |
| JP | 2018-523934 A | 8/2018 |
| JP | 2019-048706 A | 3/2019 |
| WO | 2018076058 A1 | 5/2018 |
| WO | 2018102861 A1 | 6/2018 |
| WO | 2021035297 A1 | 3/2021 |

OTHER PUBLICATIONS

Extended European search report for Application No. 20856150.6 dated Jan. 8, 2023 (7 pages).
Office Action issued on Jan. 30, 2024 for Japanese Application No. 2022-513431 (9 pages including English Translation).
Examination Report issued on Nov. 10, 2023 for Australian Application No. 2022201821 (4 pages).
First Office Action issued on Oct. 11, 2023 for Chinese Application No. 201980028938.5 (28 pages including English Translation).
Office Action issued on Sep. 26, 2023 for Japanese Patent Application No. 2020-545347 (8 pages including English Translation).
Search Report for European Patent Application No. 19760815.1 (Mar. 25, 2021).
Office Action for Japanese Patent Application No. 2020-545347 (Mar. 7, 2023).
Office Action for Indian Patent Application No. 202027041007 (Jun. 21, 2022).
PCT International Search Report for PCT Application No. PCCT/AU2020/050891 mailed Oct. 19, 2020 (15 pages).
PCT Written Opinion for PCT Application No. PCCT/AU2020/050891 mailed Oct. 19, 2020 (8 pages).
Ovadia, "Automate the Internet with "If This Then That" (IFTTT)," Behavioral & Social Sciences Librarian, vol. 33, pp. 208-211, (2014).
International Search Report for International Application No. PCT/AU2019/050142 mailed Mar. 18, 2019 (5 pages).

* cited by examiner

OBJECT MONITORING

CROSS-REFERENCE TO RELATED APPLICATIONS

This application is a National Stage Application of PCT/AU2020/050891, filed 25 Aug. 2020, which claims benefit of Serial No. 2019903196, filed 30 Aug. 2019 in Australia, and which applications are incorporated herein by reference. To the extent appropriate, a claim of priority is made to each of the above disclosed applications.

BACKGROUND OF THE INVENTION

The present invention relates to a system and method for monitoring objects. In one particular example, the present invention relates to a system and method for predictive monitoring of objects based on an object context. In another example, the present invention relates to a system and method for analysing tag broadcast messages received in an object monitoring system. In another example, the present invention relates to a system and method for updating object rules in an object monitoring system.

DESCRIPTION OF THE PRIOR ART

The reference in this specification to any prior publication (or information derived from it), or to any matter which is known, is not, and should not be taken as an acknowledgement or admission or any form of suggestion that the prior publication (or information derived from it) or known matter forms part of the common general knowledge in the field of endeavour to which this specification relates.

Particularly in the context of occupational health and safety, there are a large number of rules regarding the way in which objects should operate, be handled, used or maintained. For example, in many situations there are restrictions on movement of hazardous objects, such as gas bottles, or robots, precluding these being used in certain environments, such as in enclosed buildings, in the vicinity of people, or the like. Furthermore, there are often requirements for equipment to be inspected on a regular basis to ensure it is operating in a correct manner.

In many cases, there are a large number of different rules governing different objects, making it difficult for users to ensure they are compliant when using, handling or otherwise interacting with objects. Furthermore, whilst there is some degree of uniformity over such rules, there can also be significant differences, for example with different organisations implementing their own internal rules, meaning it can be extremely difficult for visitors or casual workers to ensure compliance.

Despite this, compliance is important to ensure safety of workers, and failure to ensure compliance can lead to accidents and significant liabilities, making this of utmost commercial importance.

Current approaches to compliance monitoring typically involve education and training programs, used in conjunction with oversight, such as regular monitoring of worker activities by a supervisor. However, these approaches are not always successful.

US2017/046945 describes a gas detector (102) with a Bluetooth low energy (BLE) communicator. An auditor device with a BLE communicator is provided. An advertisement packet is broadcasted by the gas detector when the gas detector is non-compliant with predefined standards, in which the advertisement packet has non-compliance information. The advertisement packet is received by the auditor device from the gas detector, and the non-compliant gas detector is indicated by the auditor device. The non-compliance information of the advertisement packet is displayed by the auditor device.

Whilst this therefore describes a system suitable for monitoring compliance of a gas detector, this is of limited value in that it only operates in one very particular scenario.

U.S. Pat. No. 9,824,571 describes an apparatus that alerts based on a distance between items. The apparatus includes a radio for communicating with an internet of things (IoT) tag on an item. A locator module determines a distance between two or more items, and an alert or module alerts a user to a violation of a proximity rule.

Whilst this therefore describes a system capable of proximity monitoring, this system is restricted to proximity monitoring, and is therefore only able to operate in one particular scenario.

In addition to ensure compliance with rules, monitoring of objects can also be used for a wide range of other scenarios. However again, suitable techniques for object monitoring are typically limited, and are often overtly complex and expensive.

US20160110975 describes an intelligent electronic system for use with an item container/carrier, such as a suitcase, briefcase, backpack, car trunk, purse, wallet, storage compartment, storage facility, locker, or similar. The system is used with item containers/carriers that contain portable items which can be identified by electronic, optical, or similar means. For example, the portable items may be outfitted with portable item reporting devices (BIRDS) which provide item monitoring and signaling; or the portable items may be identified via RFID tags. The system includes a sensor to identify portable items in the container/carrier via their BIRD signals, RFID signatures, or optical signature. The system includes memory to store identifications of portable items. The system can store one or more lists of specified portable items which are expected to be present within the containers/carriers, possibly with different lists being applicable in different contexts. The system can scan the container to identify items which should be present, but are missing. The system can scan the container to establish a current list of present items, to be saved for future content assessments. The intelligent electronic system may be integrated into the structure of the container or carrier, making the container or carrier an intelligent container.

SUMMARY OF THE PRESENT INVENTION

In one broad form, an aspect of the present invention seeks to provide an object monitoring system including: a plurality of tags, each tag being associated with a respective object in use and including: a tag transceiver configured to transmit or receive messages; a tag processing device configured to: determine context data indicative of a context associated with the object and/or other objects; generate tag history data indicative of: an object type identifier indicative of an object type of the respective object; and, at least some context data for a time period; and, one or more processing devices configured to analyse tag history data so that results of the analysis can be used to predict trigger events.

In one embodiment, the one or more processing devices are configured to: analyse trigger tag history data from a plurality of tags, the trigger tag history data being tag history data relating to a trigger event; and, generate a predictive model indicative of relationships between context data and one or more trigger events, the predictive model being usable to predict trigger events.

In one embodiment, the tag includes a tag memory configured to store object rules, and wherein the tag processing device is configured to: use context data and object rules to identify a trigger event; and, generate trigger tag history data in response to detection of the trigger event.

In one embodiment, the one or more processing devices are configured to: use tag history data and object rules to identify a trigger event; and, identify the trigger tag history data in response to detection of the trigger event.

In one embodiment, the one or more processing devices are configured to analyse trigger tag history data using machine learning techniques.

In one embodiment, the one or more processing devices are configured to generate a respective predictive model for each of a number of different trigger events.

In one embodiment, the tag history data is at least one of: a feature vector; and, used to derive a feature vector.

In one embodiment, the one or more processing devices are configured to use a predictive model and tag history data to predict a trigger event.

In one embodiment, the one or more processing devices are configured to: use a predictive model and tag history data to calculate a likelihood of a trigger event; and, selectively perform an action depending on the likelihood of the trigger event.

In one embodiment, the one or more processing devices are configured to generate a notification of a predicted trigger event.

In one embodiment, the one or more processing devices use a predictive model to generate one or more predictive object rules, and wherein the tag processing device is configured to use predictive object rules and context data over a time period to predict when a trigger event is likely to occur.

In one embodiment, the tag processing device determines the context data based on at least one of: one or more tag locations determined based on location tag broadcast messages received via the tag transceiver from one of a plurality of location beacons; one or more tag broadcast messages received from other tags associated with other objects; and, sensor data from one or more sensors; and, stored context data.

In one embodiment, the tag includes an object type identifier indicative of at least an object type of the associated objected.

In one embodiment, respective object rules are defined for one or more respective object types.

In one embodiment, the tag processing device is configured to cause the tag transceiver to transmit a tag broadcast message including: an object type identifier indicative of at least an object type of the associated respective object; and, context data associated with the respective object.

In one embodiment, the tag broadcast message includes a data packet including: a packet header containing the object type identifier; and, a payload containing the context data.

In one embodiment, the tag processing device is configured to: receive one or more tag broadcast messages received from one or more other tags associated with one or more other objects; determine an object type of the one or more other objects using an object type identifier associated with each tag broadcast message; and, process at least some of the tag broadcast messages using an object rule associated with the respective object type.

In one embodiment, the tag processing device is configured to generate a tag broadcast message so that context data is stored in respective portions of the tag broadcast message in accordance with a defined message format associated with the respective object type.

In one embodiment, the tag processing device is configured to use relevant context data and an object rule to determine if a trigger event has occurred.

In one embodiment, the tag processing device is configured to process at least one tag broadcast message by: accessing an object rule associated with an object type of the other object, wherein the object rule is indicative of a defined message format associated with the respective object type that specifies one or more portions of the tag broadcast message that contain relevant context data; using the object rule to identify relevant context data in the tag broadcast message; and, using the relevant context data and the object rule to identify if a trigger event has occurred.

In one broad form, an aspect of the present invention seeks to provide an object monitoring system including a plurality of tags, each tag being associated with a respective object in use and including: a tag transceiver configured to transmit or receive messages; a tag processing device configured to: receive one or more tag broadcast messages from one or more other tags associated with one or more other objects, each tag broadcast message including: an object type identifier indicative of at least an object type of the other object; and, context data associated with the other object, wherein the context data is stored in respective portions of the tag broadcast message in accordance with a defined message format associated with the respective object type; process at least one received tag broadcast message by: accessing an object rule associated with an object type of the other object, wherein the object rule is indicative of a defined message format associated with the respective object type that specifies one or more portions of the tag broadcast message that contain relevant context data; using the object rule to identify relevant context data in the tag broadcast message; and, using the relevant context data and the object rule to identify if a trigger event has occurred.

In one embodiment, object rules are stored in tag memory as code, and wherein the tag processing device is configured to execute the code to identify if a trigger event has occurred.

In one embodiment, the code includes a plurality of code snippets, each snippet corresponding to a respective object rule.

In one embodiment, the tag processing device is configured to repeatedly execute the plurality of code snippets.

In one embodiment, object rules are stored in tag memory as executable code snippets, and wherein the tag processing device is configured to: receive a tag broadcast message from another tag associated with another object; determine an object type identifier associated with the tag broadcast message; identifying one or more of a plurality of executable code snippets using the object type identifier, each code snippet corresponding to an object rule and defining one or more portions of the tag broadcast message containing relevant context data; and, execute the one or more code snippets to thereby analyse relevant context data in the one or more portions to thereby determine if a trigger event has occurred.

In one embodiment, the tag processing device is configured to: receive a rule broadcast message; and, use the rule broadcast message to modify one or more object rules.

In one embodiment, the rule broadcast message is a tag broadcast message associated with a virtual object and wherein the rule broadcast message includes: a virtual object type identifier indicative of the virtual object; and, virtual object context data at least partially indicative of a modification to an object rule.

In one broad form, an aspect of the present invention seeks to provide an object monitoring system including a plurality of tags, each tag being associated with a respective object in use and including: a tag memory configured to store object rules; a tag transceiver configured to transmit or receive messages; a tag processing device configured to: receive one or more tag broadcast messages from one or more other tags associated with one or more other objects, each tag broadcast message including: an object type identifier indicative of at least an object type of the other object; and, context data associated with the other object; process at least one received tag broadcast message by: accessing an object rule associated with an object type of the other object; using the context data and the object rule to identify if a trigger event has occurred; and, if a trigger event has occurred, perform an action associated with the trigger event, and wherein: at least one tag broadcast message is a rule broadcast message associated with a virtual object, the rule broadcast message being indicative of: a virtual object type identifier indicative of the virtual object; and, virtual object context data at least partially indicative of a modification to an object rule; and, the tag processing device is responsive to the rule broadcast message to modify one or more object rules.

In one embodiment, the tag processing device is configured to modify an object rule by modifying one or more parameters associated with the object rule in accordance with the context data of the rule broadcast message.

In one embodiment, the tag processing device is configured to: use the rule broadcast message and an object rule to identify a trigger event; and, perform an action associated with the trigger event to thereby modify one or more object rules.

In one embodiment, the system includes a plurality of location beacons, each location beacon being configured to generate a location tag broadcast message indicative of a beacon location.

In one embodiment, at least one of: a message is transferred to a client device via a location beacon; a message is transferred to a tag via a location beacon; and, object rules are uploaded to the tag via one or more of the plurality of location beacons.

In one embodiment, the one or more processing devices form part of at least one of: one or more computer systems; one or more smart phones; one or more tablets; and, one or more mobile computing devices.

In one embodiment, the tag processing device is configured to: compare a tag location to location restrictions defined in the object rules for the respective object; and, identify a trigger event if the tag location breaches the location restrictions.

In one embodiment, the tag processing device is configured to: determine a proximity of one or more other objects using one or more broadcast messages transmitted by one or more other tags associated with the one or more other objects; compare the proximity to proximity restrictions for the defined in object rules for the respective objects; and, identifies a trigger event if the proximity breaches the proximity restrictions.

In one embodiment, a first tag: uses broadcast messages received from one or more other tags to determine other tag locations indicative of locations of the one or more other tags; and, determines the proximity using the other tag locations.

In one embodiment, the tag: uses sensor data from at least one sensor to determine a measured parameter value; and, identifies a trigger event if the measured parameter value breaches parameter value restrictions.

In one embodiment, the at least one sensor includes at least one of: a temperature sensor; a pressure sensor; a humidity sensor; and, a radiation sensor.

In one embodiment, in response to detection of the trigger event, the tag processing device is configured to at least one of: determine an action associated with the trigger event; and, cause the action to be performed.

In one embodiment, in response to receipt of a trigger notification, the tag processing device is configured to at least one of: determine an action associated with the trigger notification; and, cause the action to be performed.

In one embodiment, the action includes at least one of: generating an alert; controlling an object; and, generating a notification.

In one embodiment, the tag includes a tag memory configured to store at least one of: context data; and, object rules.

In one embodiment, the stored context data is indicative of at least one of: an object history; an action history; a trigger history; a tag movement; one or more measured parameters; and, an elapsed time period.

In one embodiment, the tag includes an output device including at least one of: an audio output; a light source; and, a signal generator.

In one broad form, an aspect of the present invention seeks to provide an object monitoring system including a plurality of tags, each tag being associated with a respective object in use and including: a tag transceiver configured to transmit or receive messages; a tag processing device configured to: determine context data indicative of a context associated with the object and/or other objects; generate tag history data indicative of: an object type identifier indicative of an object type of the respective object; and, at least some context data for a time period, and wherein the tag history data can be analysed so that results of the analysis can be used to predict trigger events.

In one broad form, an aspect of the present invention seeks to provide an object monitoring system including one or more processing devices configured to: analyse trigger tag history data received from a plurality of tags, the trigger tag history data being tag history data relating to a trigger event, and the tag history data being indicative of: an object type identifier indicative of a type of the respective object; and, context data indicative of a context associated with the object and/or other objects; use results of the analysis to predict trigger events.

In one broad form, an aspect of the present invention seeks to provide an object monitoring method including: providing a plurality of tags, each tag being associated with a respective object in use and including: a tag transceiver configured to transmit or receive messages; a tag processing device; using the tag processing device to: determine context data indicative of a context associated with the object and/or other objects; generate tag history data indicative of: an object type identifier indicative of an object type of the respective object; and, at least some context data for a time period; and, using one or more processing devices to analyse tag history data so that results of the analysis can be used to predict trigger events.

In one broad form, an aspect of the present invention seeks to provide an object monitoring method including: providing a plurality of tags, each tag being associated with a respective object in use and including: a tag transceiver configured to transmit or receive messages; a tag processing device; and, using the tag processing device to: receive one or more tag broadcast messages from one or more other tags associated with one or more other objects, each tag broadcast message including: an object type identifier indicative of at least an object type of the other object; and, context data associated with the other object, wherein the context data is stored in respective portions of the tag broadcast message in accordance with a defined message format associated with the respective object type; process at least one received tag broadcast message by: accessing an object rule associated with an object type of the other object, wherein the object rule is indicative of a defined message format associated with the respective object type that specifies one or more portions of the tag broadcast message that contain relevant context data; using the object rule to identify relevant context data in the tag broadcast message; and, using the relevant context data and the object rule to identify if a trigger event has occurred.

In one broad form, an aspect of the present invention seeks to provide an object monitoring system including a plurality of tags, each tag being associated with a respective object in use and including: a tag transceiver configured to transmit or receive messages; a tag processing device configured cause the tag transceiver to transmit a tag broadcast message including: an object type identifier indicative of at least an object type of the associated respective object; and, context data associated with the respective object, wherein different context data is stored in respective portions of the tag broadcast message in accordance with a defined message format associated with the respective object type.

In one broad form, an aspect of the present invention seeks to provide an object monitoring method including: providing a plurality of tags, each tag being associated with a respective object in use and including: a tag transceiver configured to transmit or receive messages; a tag processing device; and, using the tag processing device to cause the tag transceiver to transmit a tag broadcast message including: an object type identifier indicative of at least an object type of the associated respective object; and, context data associated with the respective object, wherein different context data is stored in respective portions of the tag broadcast message in accordance with a defined message format associated with the respective object type.

In one broad form, an aspect of the present invention seeks to provide an object monitoring method including: providing a plurality of tags, each tag being associated with a respective object in use and including: a tag memory configured to store object rules; a tag transceiver configured to transmit or receive messages; a tag processing device; and, using the tag processing device to: receive one or more tag broadcast messages from one or more other tags associated with one or more other objects, each tag broadcast message including: an object type identifier indicative of at least an object type of the other object; and, context data associated with the other object; process at least one received tag broadcast message by: accessing an object rule associated with an object type of the other object; using the context data and the object rule to identify if a trigger event has occurred; and, if a trigger event has occurred, perform an action associated with the trigger event, and wherein: at least one tag broadcast message is a rule broadcast message associated with a virtual object, the rule broadcast message being indicative of: a virtual object type identifier indicative of the virtual object; and, virtual object context data at least partially indicative of a modification to an object rule; and, the tag processing device is responsive to the rule broadcast message to to modify one or more object rules.

It will be appreciated that the broad forms of the invention and their respective features can be used in conjunction and/or independently, and reference to separate broad forms is not intended to be limiting. Furthermore, it will be appreciated that features of the method can be performed using the system or apparatus and that features of the system or apparatus can be implemented using the method.

BRIEF DESCRIPTION OF THE DRAWINGS

Various examples and embodiments of the present invention will now be described with reference to the accompanying drawings, in which.

DETAILED DESCRIPTION OF THE PREFERRED EMBODIMENTS

Figure 1:
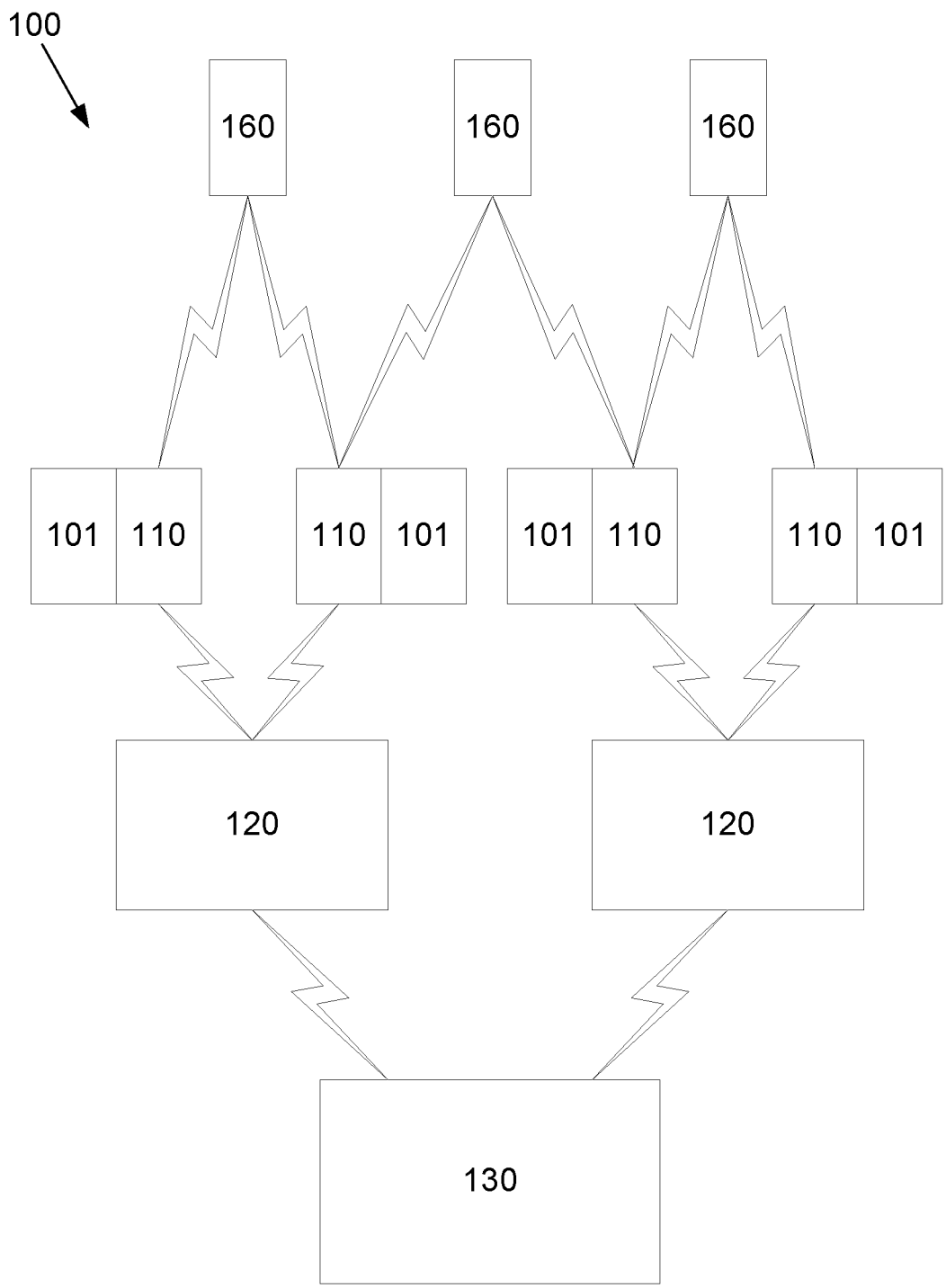
FIG. 1 is a schematic diagram of an example of an object monitoring system.

An example of an object monitoring system will now be described with reference to FIG. 1.

In this example, the system includes one or more tags 110, each of which is associated with a respective object 101 in use. The tags 110 are electronic tags 110 that are capable of communicating utilising a short-range wireless communication protocol such as Bluetooth, Bluetooth Low Energy (BLE) or the like. The tags 110 are typically associated with an object 101 by having the tag 110 attached to or integrated into the object 101 in some manner, depending on the physical form factor of the tag 110 and the object 101. This is performed so that the tag 110 is generally provided in the same environment as the object, and has a similar context to the object, such as the same physical location and optionally is subject to similar conditions, such as levels of temperature, humidity or the like.

Whilst the tags can have any form, typically the tags include components, such as a tag memory configured to store object rules, a tag transceiver configured to transmit or receive messages and a tag processing device configured to perform any required operations. The components could be of any appropriate form, and could include volatile and/or non-volatile memory and a short-range wireless transceiver, such as a Bluetooth transceiver. The processing device could be any electronic processing device such as a microprocessor, microchip processor, logic gate configuration, firmware optionally associated with implementing logic such as an FPGA (Field Programmable Gate Array), or any other electronic device, system or arrangement. For ease of illustration the remaining description will refer to a tag processing device, but it will be appreciated that multiple tag processing devices could be used in a tag, with processing distributed between the tag processing devices as needed, and that reference to the singular encompasses the plural arrangement and vice versa.

One or more location beacons 160 can be provided, which in one example are configured to periodically generate a location broadcast message indicative of a beacon location, which is transmitted via a short-range wireless communication protocol, such as Bluetooth, Bluetooth Low Energy (BLE), or the like. The location broadcast messages can be received by devices, such as the tags 110, allowing the tag to determine a location. The location beacon can be of any appropriate form, and could include iBeacons™, or other similar devices. The configuration of such beacons is known in the art and will not therefore be described in any further detail, although it will be noted that in one example these can have a configuration similar to the tags 110, which are described in more detail below.

One or more processing devices 120 can be provided that communicate with the tags 110 and an optional repository 130, which can be configured to store object rules for a plurality of different types of object.

The processing devices 120 can be adapted to communicate with the tags 110 either directly using a short-range wireless communication protocol, or via intermediate networks or devices, such as the location beacons, as will be described in more detail below. The processing devices 120 can also communicate with the repository via one or more communications networks, such as the Internet, local area networks, wide area networks, or the like.

The processing devices 120 could be of any appropriate form and in one particular example could include one or more of client devices, processing systems, computer systems, smart phones, tablets, mobile computing devices, or the like. Different types of processing devices might be provided, and in one example, the processing devices can include a combination of portable communication devices, such as mobile phones, as well as cloud based or other network based computer systems, such as servers, or similar. Client devices could also include custom hardware devices specifically configured to provide notifications, such as audible and/or visual alerts, or similar. As outlined above, for ease of illustration the remaining description will refer to a processing device, but it will be appreciated that multiple processing devices could be used, with processing distributed between the processing devices as needed, and that reference to the singular encompasses the plural arrangement and vice versa.

The repository 130 could also be of any suitable form, and could include a database or other similar data store, optionally coupled to a processing system, such as a computer system, server, or the like, which provides onward connectivity to the repository. The repository is typically used to store object rules, which can be uploaded onto the tags, to allow object monitoring to be performed.

In this regard the object rules typically embody compliance rules or regulations regarding permitted or restricted actions, behaviours, characteristics or circumstances associated with different types of objects. Thus, the object rules will typically be different for objects 101 that are to be treated differently, so that, for example, the object rules for a tag associated with a hydrogen gas bottle, may differ to the object rules for a tag associated with an oxygen gas bottle. This allows the object rules to be used to assess whether an object is in breach of the rules or regulations, which is typically identified as a trigger event. Thus, a trigger event will typically arise when certain conditions or other criteria specified within the object rules are met or not met, depending on the nature of the rules. However, it will be appreciated that object rules are not restricted to embodying compliance rules or regulations, and could be used to monitor any aspect of object use or behaviour.

Object rule compliance is typically assessed based on a context associated with the object, so that for example, different rules may apply in different facilities, depending on differences in rules for the different facilities. The context is embodied as context data, which can be in any one of a number of different forms and may be obtained from a number of different sources. For example, the context data could correspond to one or more sensed parameters, such as a location, proximity, temperature, humidity, pressure, or the like.

In one example, the context data is at least partially based on messages received by the tag 110 from one or more external devices. This can include location messages broadcast by the location beacons 160, allowing the tag processing device to determine a tag location. For example, an object 101 may have a permitted area of use, in which case the tag 110 can compare context data in the form of a current tag location to the permitted use area and identify a trigger event if the tag 110 is outside the permitted use area. Similarly, the rules could define exclusion zones, with a trigger event occurring if the tag 110 is located within the exclusion zone. Thus, it will be appreciated that in this example, the absolute position of the object and hence tag, is used independent of any other tags, in order to determine when an event occurs.

In another example, context data can also be based on tag messages received from other tags 110, or messages received from client devices 120. For example, a broadcast message received from another tag 110 can be used to allow the tag 110 to determine context data regarding another object, such as a proximity or movement of a tag associated with another object. This can be used to allow a relative proximity or movement of two objects to be determined, so that a trigger can be identified if two objects are in close proximity, are separated by more than a set distance, or are moving towards/away from each other.

In another example, the context data could also be determined using sensor data obtained from one or more sensors, located on-board or in communication with the tag 110. The sensor data typically relates to one or more sensed parameters, such as a temperature sensed by a temperature sensor, a humidity sensed by a humidity sensor, a pressure sensed by a pressure sensor, or radiation, such as visible or non-visible electromagnetic radiation, sensed by a radiation sensor. This could be used for example to generate an alert in the event that an object is exposed to a temperature greater than a defined limit. It will be appreciated however that other sensors could be provided and that the listed sensors are for the purpose of illustration only and are not intended to preclude the use of other sensors.

Additionally, and/or alternatively, context data can be based on stored context data, which in one example is stored in the tag memory. The stored context data can be used to store any form of context data, such as previous sensor readings, previous trigger events that have been identified, previous actions that have been performed, previous input commands received, or the like. Additionally, and/or alternatively the stored context data can correspond to defined parameters, or the like, which can be used in interpreting the object rules, for example to define threshold values against which measured values are compared. By way of example, the stored context data could include an indication of when a device last underwent maintenance or compliance checking, with this being used to identify an event when schedule follow-up maintenance or compliance checking is due.

In any event, it will be appreciated that, comparison of the context data to the object rules is used to identify if a trigger event has occurred. It will be appreciated from this that a wide range of different trigger events could be defined with the scope of these largely being restricted only by the nature of the context data available to the tag 110. A number of further example trigger events will be described in more detail below.

Once a trigger event has been identified, the tag 110 can also optionally operate to determine an action associated with the trigger event, using the object rules, allowing the tag 110 to cause the action to be implemented. The action is typically specified as part of the object rules and will depend on the particular trigger event that has been identified. Thus, it will be appreciated that the object rules will typically define a number of different trigger events, together with an associated action for each trigger event.

The nature of the action and the manner in which this is implemented will vary depending on the particular circumstances and the preferred implementation. For example, the action could include generating an alert or notification locally on the tag, using an output device, or similar, allowing a user to understand that a compliance rule has been breached or is about to be breached, and allowing them to take mitigating action, such as by moving the object, as well as allowing breaches or potential breaches to be recorded for logging purposes. Alternatively, the action could be performed remotely, by transferring an action message to a third-party device, such as the client device, or one or more other processing systems, either directly, or via the location beacons, allowing these to cause the action to be performed. In the context of compliance monitoring, actions would typically include generating notifications for users, supervisors, or other individuals, recording or logging of the trigger events, and optionally initiating safety overrides, such as shutting down of equipment. However, in this or other contexts, a wide range of different actions could be implemented, such as causing transactions to be performed, or the like, as will be described in more detail below.

The process of object monitoring using the above described arrangement is described in more detail in copending application PCT/AU2019/050142, the contents of which are incorporated herein by cross reference.

Figure 2:
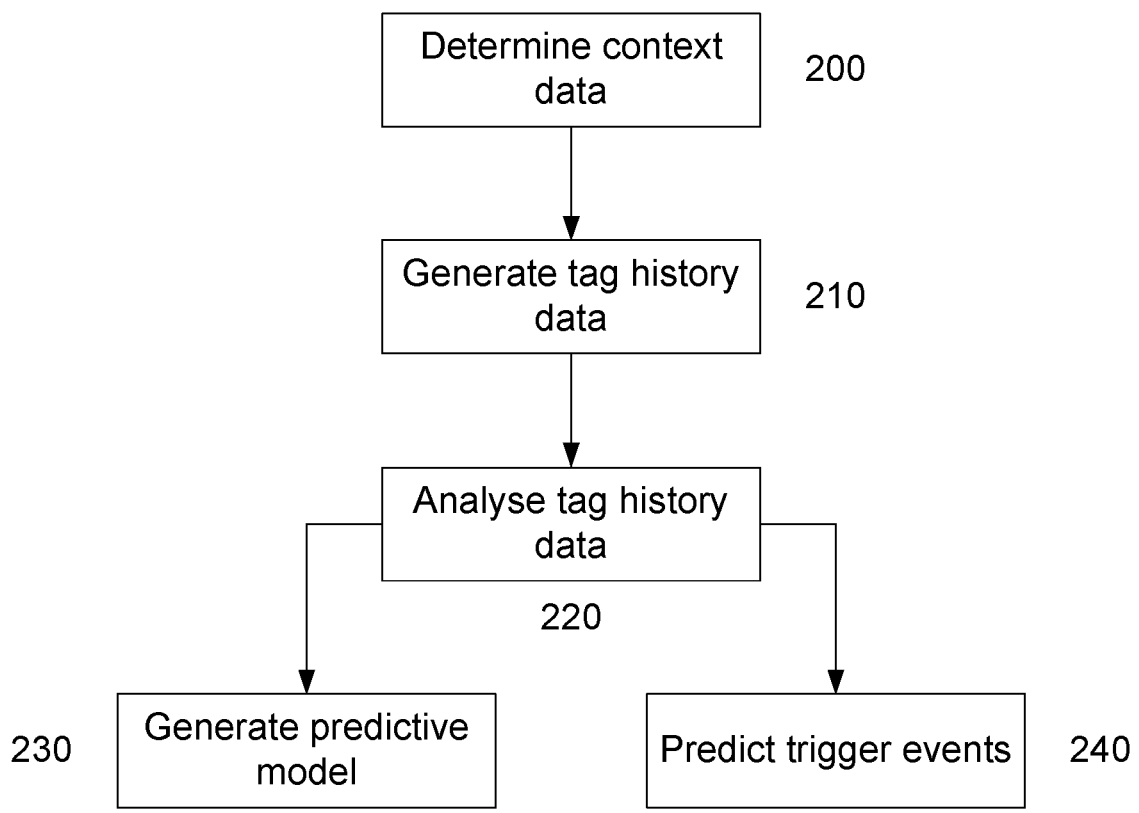
FIG. 2 is a flow chart of an example of a method for use in a predictive object monitoring process.
Figure 3:
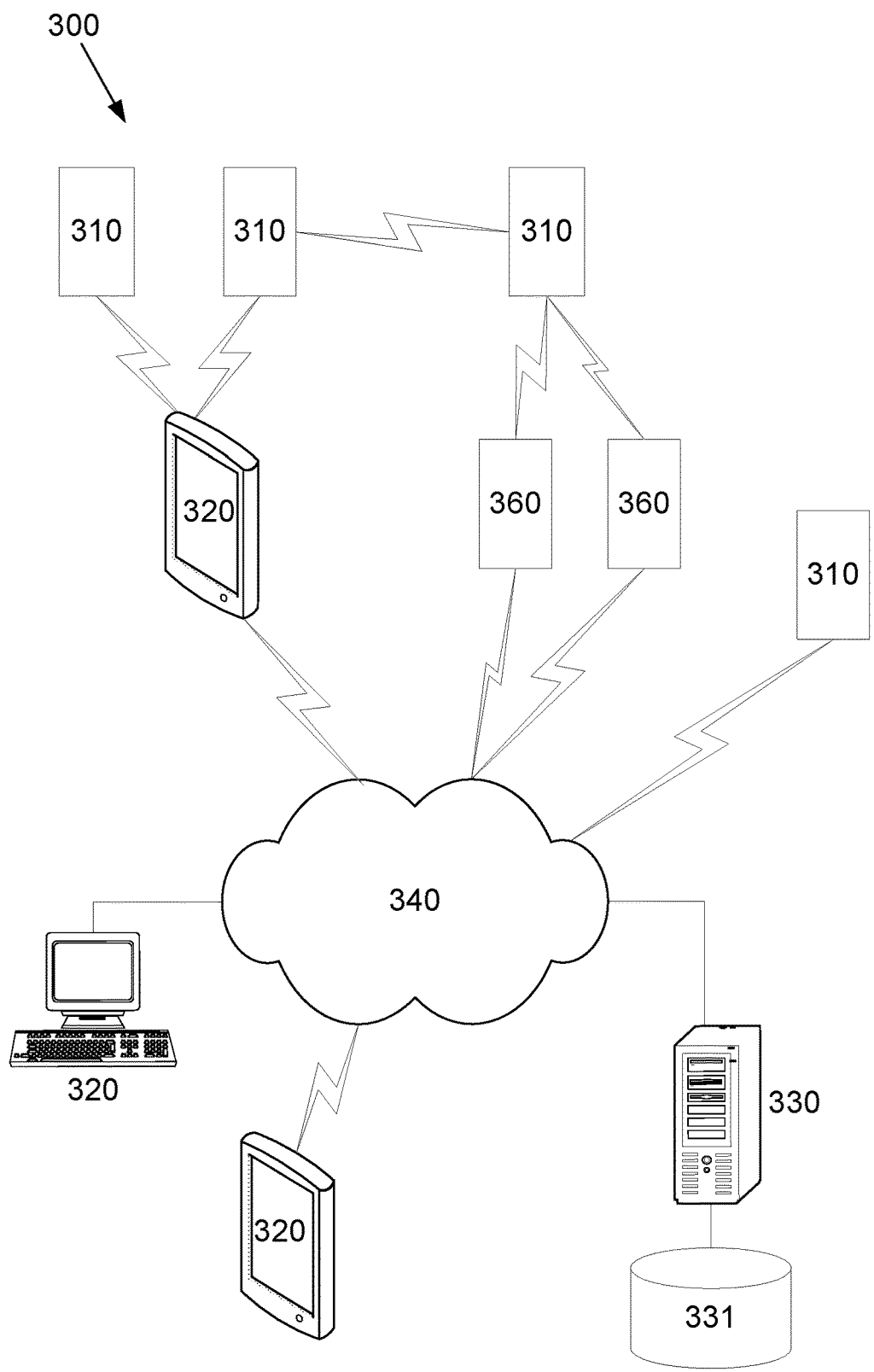
FIG. 3 is a schematic diagram of a specific example of an object monitoring system.

An example of a process for predictive object monitoring using the above described system will now be described with reference to FIG. 2.

In this example, at step 200, the tag processing device is configured to determine context data which is at least partially indicative of a context associated with the object and/or other objects. The nature of the context data and the manner in which this could be determined will vary depending on the preferred implementation, the current circumstances, the use, operation or nature of the object, or the like.

For example, the context could include a location of the object, in which case the tag processing device could determine one or more tag locations based on location tag broadcast messages received via the tag transceiver from one of a plurality of location beacons. Alternatively, the context could include information regarding other objects, such as a proximity of other objects, in which case the tag processing device could determine the context data from one or more tag broadcast messages received from other tags associated with other objects. In another example, the context data could be determined based on sensor data from one or more sensors on board the tag and/or object, and/or could be based on stored context data, or the like. Further examples will be described in more detail below.

At step 210, the tag processing device is configured to generate tag history data. The tag history data is indicative of an object type identifier indicative of an object type of the respective object, and context data for a period of time, such as a few seconds, minutes, or another suitable time period. Thus, for example, the tag history data could be indicative of a series of locations showing movement of the object over the time period, a sequence of sensor readings captured during the time, details of proximity to other objects, or the like. The tag history data could include all of the context data generated during the time period, or could include a limited amount of context data, for example, including a subset of context data, such as context data captured at one second intervals, or similar.

The tag history data is typically provided to the one or more processing devices 120, which could be achieved in any suitable manner depending on the preferred implementation and the nature of the processing devices 120. For example, if the processing devices include a client device, such as a mobile phone, the tag history data could be transmitted directly via a short-range communications protocol such as Bluetooth, whereas if the processing devices include a computer system, tag history data could be transmitted via intervening networks, client devices, or location beacons, as will be described in more detail below. The tag history data could be transmitted periodically, for example, transmitting the data every 10 minutes, or this could be performed in response to an event, such as detection of a trigger event, as will be described in more detail below.

At step 220, the one or more processing devices 120 analyse tag history so that results of the analysis can be used to predict trigger events. This can be performed in a number of different ways depending on the preferred implementation.

In one example, at step 230 the analysis is used to generate a predictive model, which can be used to predict trigger events. In this regard, the processing devices 120 can be configured to analyse trigger tag history data, which is tag history data relating to, and more typically, preceding a trigger event. In this regard, if a trigger event is detected by a tag as a result of comparison of context data to object rules, the tag processing device can be configured to generate and upload trigger tag history data to the one or more processing devices. Alternatively, the one or more processing devices 120 can be used to receive tag history data and then analyse this to determine trigger events, and hence identify a subset of the tag history data as trigger tag history data. Once sufficient trigger tag history data has been obtained, typically by obtaining trigger tag history data from multiple tags for a common object type and/or trigger event, the trigger tag history data can be analysed to generate a predictive model indicative of relationships between context data and one or more trigger events.

In this regard, it will be appreciated that trigger events can often arise as a result of similar sets of circumstances. For example, if an object is excluded from a defined area, monitoring movement of objects approaching the area can be used to identify patterns of movements that typically result in the object entering the area. In this instance, once such a pattern has been identified, this can be incorporated into a predictive model that can then subsequently be used to analyse tag history data received from tags to predict when an object might enter the area.

The nature of the predictive model and the manner in which this is generated will vary depending on the preferred implementation, although in one example the predictive model is a computational model derived using machine learning techniques as will be described in more detail below.

In another example, the processing devices 120 can be used to analyse received tag history data, and use this to predict trigger events. For example, this could be performed using tag history data and a predictive model, to thereby determine a likelihood a trigger event is to occur. Alternatively, this could be performed using any other suitable analysis technique. Thus, by receiving tag history data including context data spanning a time period, this allows the processing devices 120 to analyse an ongoing pattern of behaviour and use this to predict if a trigger event is likely and/or is going to occur.

Accordingly, the above described process operates by examining tag history data including at least some context data collected from tags prior to a trigger event occurring, using this to establish a predictive model and/or predict trigger events, prior to these occurring. It will be appreciated that the ability to such predictive analysis can be used to perform an action, such as generating an alert or notification, prior to a breach of a rule or regulation occurring. As the system is typically, although not exclusively, used for safety monitoring, generating an alert prior to a rule breach occurring is typically a better outcome than waiting for a breach to occur, and hence provides for improved outcomes.

A number of further features will now be described.

As mentioned above, in one example, the tag typically includes a tag memory configured to store object rules. This allows the tag processing device to use context data and object rules to identify a trigger event. As will be described in more detail below, this can be used to trigger actions, such as generating an alert. In the context of the predictive analysis however, this can be used to cause the tag processing device to generate trigger tag history data in response to detection of the trigger event. Thus, the tag processing device can extract some or all of the context data collected and/or generated preceding a trigger event, and provide this to the one or more processing devices, allowing this to be analysed. Alternatively however, the tag processing device could simply upload tag history data to the one or more processing devices, allowing these to use the tag history data and object rules to identify a trigger event, and thereby identify the trigger tag history data.

In one example, the one or more processing devices are configured to analyse the trigger tag history data at least in part using machine learning techniques. In this regard, this process typically involves selecting a generic model and then using machine learning techniques to train the model to generate a specific predictive model.

The nature of the model and the training performed can be of any appropriate form and could include any one or more of decision tree learning, random forest, logistic regression, association rule learning, artificial neural networks, deep learning, inductive logic programming, support vector machines, clustering, Bayesian networks, reinforcement learning, representation learning, similarity and metric learning, genetic algorithms, rule-based machine learning, learning classifier systems, or the like. As such schemes are known, these will not be described in any further detail.

In one example, this can include training a single model to determine a likelihood of a single trigger event occurring. Thus, in this example, the processing devices are configured to generate a respective predictive model for each of a number of different trigger events, including respective models for different types of objects and different types of trigger events, so that a single model is used to predict a single type of trigger event for a single type of object. However, this is not essential, and alternatively a single predictive model could be used to determine a likelihood of multiple different trigger events occurring. Similarly, models could also be specific for multiples types of object and/or could be specific for different categories or classes of objects.

To assist with generation of the models, the tag history data, including the trigger tag history data, could be provided in the form of a feature vector, which can be used directly in the machine learning process. Similarly, features vectors or tag history data could be easily applied to a resulting predictive model, allowing a likelihood of a trigger event to be determined. In this instance, the feature vector will typically include a number of different parameters, which could include values of a particular parameter and how this changes over time and/or could include values for multiple different parameters. For example, this could include a sequence of locations, representing movement of an object through an environment, and/or could include values of sensed parameters, including temperature, pressure or the like. As an alternative to providing the tag history data as a feature vector, alternatively the one or more processing devices could be used to derive a feature vector from received tag history data.

In one example, the one or more processing devices use the predictive model to generate one or more predictive object rules, the predictive object rules being object rules that can be used to predict when a trigger event is likely to occur. In this instance, the object rules can be uploaded to tags associated with relevant objects, so that the predictive object rules are used in a manner similar to the object rules, allowing the tags to perform checks to determine if there is a likelihood of a rule breach, which can in turn be actioned in an appropriate manner, such as by having the tag cause an action to be performed. This will typically be performed in a manner similar to that which occurs when a trigger event is detected, and will be described in more detail below. However, it will be appreciated that the action performed may vary, so that for example a different alert could be generated if an object rule is breached as opposed to if a predictive object rule is breached, to thereby distinguish between actual and predicted rule breaches.

As an alternative to using the predictive model to develop predictive object rules, the predictive model could be used by the one or more processing devices together with tag history data to predict a trigger event. Thus, tags could be configured to periodically transmit tag history data, with the one or more processing devices applying this to the predictive model to ascertain whether a breach of an object rule is likely to occur.

Whilst the prediction of a likely breach could simply be a binary decision, in another example, the one or more processing devices could use the predictive model and tag history data to calculate a likelihood of a trigger event and then selectively perform an action depending on the likelihood of the trigger event. Thus, the predictive model can predict a probability of an event occurring, with this being assessed to determine if an action, such as an alert or notification is required. Furthermore, alerts or notifications could be indicative of the likelihood, for example being scaled as the likelihood of a breach increases.

As previously mentioned, context data can be of any appropriate form and can be determined in any one of a number of ways, depending on the preferred implementation.

For example, the context data could include a tag location, in which case this can be determined based on tag broadcast messages received via the tag transceiver from one of a plurality of location beacons. In this regard, whilst the location of the tag 110 could be determined utilising an on-board location system, such as GPS, or the like, typically this is energy intensive and accordingly, a preferred arrangement is the utilisation of location beacons. In this instance, the tag 110 receives a location broadcast message from at least one location beacon and uses the location broadcast message to determine a tag location. The tag location could be defined relative to the beacon, for example specifying that the tag 110 is within a certain range of the beacon. More typically however, the tag 110 operates to receive location broadcast messages from multiple beacons, allowing it to triangulate its position within an environment based on the beacons that can be detected. In this instance, the tag location could be defined based on a relative position to the beacons, or could be interpreted on-board the tag 110 using a location beacon map forming part of the object rules, to allow an absolute location within an environment to be determined. Alternatively, the location broadcast message could include coordinates of each location beacon, optionally defined during a beacon configuration process, allowing the tag 110 to determine a location based on these coordinates. It will be appreciated that as the object rules might be defined for a local venue, such as a facility or site of an organisation, this can allow the location to be defined using a coordinate system specific to that locale, or using a global coordinate system, such as a longitude and latitude, depending on the preferred implementation.

The location beacons can also be leveraged to provide a communication pathway to other devices. In this regard, in one example, the location beacons are network enabled, allowing these to be coupled to one or more communications networks, such as Wi-Fi networks, or the like. In this instance, the location beacons can then be utilised in order to route communications to and/or from the tags. For example, this allows a remote client device, such as a computer system, smart phone, tablet, or the like, to transfer messages to the tags, for example to upload object rules to the tags, or to receive messages, such as action messages, from the tags.

In this instance, communication could be achieved in any suitable manner. For example, in the event that object rules are to be uploaded to a particular tag, the object rules can be forwarded to one or more of the location beacons, together with a tag identifier of the particular tag. The location beacons can then broadcast a communication request using the tag identifier, and then wait for a response. A response might be received by one or more of the beacons, in which case the beacons can communicate to select one of the beacons, which then forwards the object rules to the tag. Alternatively, the object rules could be broadcast by each of the location beacons.

The context data could also be determined using sensor data obtained from one or more sensors, located on-board or in communication with the tag 110. The sensor data typically relates to one or more sensed parameters, such as a temperature sensed by a temperature sensor, a humidity sensed by a humidity sensor, a pressure sensed by a pressure sensor, or radiation, such as visible or non-visible electromagnetic radiation, sensed by a radiation sensor. It will be appreciated however that other sensors could be provided and that the listed sensors are for the purpose of illustration only and are not intended to preclude the use of other sensors.

The context data could also be indicative of historical events, including an object history, such as previous locations or movement of the object, a previous proximity to other objects, details of use of the object, an elapsed time since actions were performed, details of maintenance actions, or the like. The historical events could also include an action history, a trigger history, or the like. It will be appreciated that this allows triggers to be based on historical or cumulative effects, and not just the immediate context of the tag 110. Finally, the context data can be determined based on messages received from a client device, for example allowing the context data to be determined based on user input commands, enabling user interaction with the tags. Using combinations of different types of context data can enable a wide range of complex monitoring to be performed, and examples of this will be described in further detail below.

In another example, the context data could relate to the context of another tag, such as a proximity of the other tag, in which case the context data could be determined based on one or more tag broadcast messages received from other tags associated with other objects. A broadcast message received from another tag 110 can be used to allow the tag 110 to determine a proximity or movement of another tag, and hence a relative proximity or movement of two objects, whilst an absolute or relative location within an environment can be determined using the location broadcast message, for example to determine if the tag is within a set distance of a location beacon.

Tag broadcast messages are typically transmitted by the tag transceiver of a tag, and then received directly by other tags within a transmission range, allowing the tag broadcast messages to be processed. To assist with this process, tags typically include an object type identifier indicative of at least an object type of the associated objected. This can be used to identify the type of object which a broadcasting tag is associated with, so that a tag receiving a tag broadcast message can use this to interpret the message and ignore tag broadcast messages that are not relevant.

Thus, in one example, the tag processing device is configured to cause the tag transceiver to transmit a tag broadcast message including an object type identifier indicative of at least an object type of the associated respective object and context data associated with the respective object, such as a tag location, measured parameter determined from sensor readings, or the like. This can be performed periodically, for example repeatedly transmitting tag broadcast messages every few seconds, or the like. Alternatively, this could be performed on demand, for example in response to trigger events, or changes in context data, for example, when a tag is moved or similar.

In any event, including the object type identifier in the broadcast message allows another tag to receive the broadcast message and more easily interpret this. Specifically, respective object rules can be defined for respective object types, so that a tag receiving a broadcast message can identify the object type associated with the tag transmitting the message and then only examine object rules relating to that object type.

Thus, on receiving a tag broadcast message, the tag processing device can examine the message to determine the object type identifier, and then review object rules stored in tag memory to determine if the object rules relate to the respective object type identifier. As a tag memory will only be populated with object rules relevant to that tag, if none of the object rules are relevant to the received tag broadcast message, the tag broadcast message can be ignored. Otherwise, the message can be processed as needed.

To make the process more efficient, the tag broadcast message can include a data packet including a packet header containing the object type identifier and a payload containing the context data. This reduces computational requirements, allowing tags and other hardware to only analyse the content of data packet headers to ascertain if the tag broadcast message is relevant to the tag, and hence needs to be processed. For example, on receiving a tag broadcast message, the tag processing device can examine the message header, retrieve the object type identifier, and assess if there are any relevant object rules, ignoring the broadcast message if not, and avoiding the need to analyse the data packet payload. This can also assist by enabling the transfer of information to be achieved without requiring devices to undergo Bluetooth pairing.

In one particular example, the tag processing device is configured to receive one or more tag broadcast messages from one or more other tags associated with one or more other objects, determine an object type of the other objects using an object type identifier associated with the tag broadcast message and then process the tag broadcast message using an object rule associated with the respective object type.

In one broad form, to further increase efficiency of object rule process, the object rule can define portions of a broadcast message that contain relevant context data, allowing this to be processed more efficiently, and an example of this will now be described in further detail.

In this regard, broadcast messages can be configured so that a certain type of information is always provided at a fixed location in the message, and more particularly so that context data is stored in respective portions of the tag broadcast message in accordance with a defined message format associated with the respective object type. For example, the message payload could be structured so that the first n bits of the message payload define the tag location, the next m bits define a sensor reading, or the like. Such message formatting could be specific and consistent to an object type, so that tag broadcast messages for a given object type always have the same format, whilst broadcast messages associated with different types of object could have a different format.

In this instance, as the object rule relates to a specific object type, the object rule can identify relevant context data that is required in order to process that rule. In one example, this is achieved by having the object rule be indicative of a defined message format associated with the respective object type that specifies one or more portions of the tag broadcast message that contain relevant context data. This allows the tag processing device to access an object rule and then identify context data that is relevant to that rule, simply by accessing defined portions of a received tag broadcast message, allowing the tag processing device to use the relevant context data and the object rule to identify if a trigger event has occurred. So, for example, if a tag processing device is processing an object rule relating to the location of another tag, the tag processing device knows only the first n bits of the tag broadcast message payload need to be analysed. Conversely, if the object rule relates to a sensor reading, only the next m bits need analysis.

This in turn allows irrelevant context data to be ignored when processing object rules. This can significantly reduce the amount of processing required and can allow large parts of a broadcast message to be ignored, allowing broadcast messages to be analysed more rapidly. This is particularly important in environments, where a large number of objects are present, which could result in a tag processing device having to process a large number of broadcast messages substantially simultaneously.

It will be appreciated that this could be performed independently of the above described predictive processing and reference to this being performed as part of a predictive process is not intended to be limiting.

In one example, in order to further minimise the data that is required to configure a tag and also increase the efficiency of rule processing, the object rules are stored in the tag memory as code, and in particular executable code, with the tag processing device being configured to execute the code to identify if a trigger event has occurred.

In one particular example, the code includes a plurality of code snippets, each snippet corresponding to a respective object rule. Thus, each object rule is embodied as a respective snippet of executable code, which typically allows the object rule to be expressed using a minimal number of bytes. This, in turn, allows the object rules to be uploaded as packetized code, having a minimal volume, thereby minimising bandwidth and resulting memory requirements. Additionally, this allows the tag processing device to be configured to repeatedly execute the plurality of code snippets and thereby efficiently process the context data to identify trigger events.

Accordingly, in one example, the tag processing device can receive a tag broadcast message from another tag associated with another object, determine an object type identifier associated with the tag broadcast message, identify one or more of a plurality of executable code snippets using the object type identifier, each code snippet corresponding to an object rule and defining one or more portions of the tag broadcast message that contain relevant context data. The tag processing device then executes the one or more code snippets to analyse relevant context data in the one or more portions, thereby determining if a trigger event has occurred.

Thus, only code relevant to the respective rule need be executed, and furthermore the code need only analyse that part of the broadcast message that includes context data relevant to the respective rule. In this manner, the quantity of analysis that needs to be performed is significantly reduced, allowing a large volume of broadcast packets to be effectively analysed.

Whilst the above has been described with respect to tag broadcast messages, it will be appreciated that this could also apply to other broadcast messages.

An example of another form of broadcast message is a rule broadcast message, which can be used to update object rules, for example to alter rule parameters associated with an object rule. For example, an object rule may specify that an alert is to be generated if an object is within x meters of another object. Changes in safety rules, may require that the value of x is changed, so this can be achieved using a rule broadcast message.

In this example, the rule broadcast message is treated as being a tag broadcast message associated with a virtual object, allowing this to be handled in the same manner as a tag broadcast message. Thus, rule broadcast messages are typically generated including a virtual object type identifier indicative of the virtual object and virtual object context data at least partially indicative of a modification to an object rule, such as a new value of a rule parameter.

In this instance, a tag processing device is configured to use a received rule broadcast message to update an object rule. Specifically, the tag processing device will typically process a rule broadcast message using a respective object rule to identify a trigger event corresponding to the need to update the object rule or a different object rule. Having identified a rule update trigger event, the tag processing device will then determine and implement an associated action thereby updating an existing object rule.

Again, it will be appreciated that the rule update process could be performed independently of the predictive processing and/or specific messaging formatting, and accordingly, in another broad form, the system provides a mechanism for updating object rules using rule broadcast messages in the form of a tag broadcast messages associated with virtual objects.

The rule broadcast message could be transmitted by tags that are positioned in an environment and not associated with physical objects (hence the references to virtual objects) or could be transmitted by other hardware, such as client devices, or location beacons.

In this regard, as previously described the system typically includes a plurality of location beacons, each location beacon being configured to generate a location broadcast message indicative of a beacon location. In addition to generating location broadcast messages, the location beacons can be used to route communications to and from the tags. For example, this could be used to allow a message to be transferred to a client device via a location beacon, a message to be transferred to a tag via a location beacon or to allow object rules to be uploaded to the tag via one or more of the plurality of location beacons.

In this instance, location beacons are typically configured to receive transmissions in predetermined communication slots, a set amount of time after transmitting location broadcast messages, as part of a normal communication protocol, for example to allow the location beacons to receive responses from the tags. In this instance, the tags can transmit messages to the location beacons during these slots, so that the messages can be subsequently routed to other devices, as needed. To achieve this, a tag processing device will select a communication slot associated with a location beacon and then transmit the message to the location beacon via the selected communication slot.

In one example, the number of communication slots available for each beacon is limited, meaning this can cause collisions if multiple tags attempt to communicate simultaneously. To avoid collisions, each tag processing device is configured to transmit an advert broadcast message advertising the tag processing device's selection of the communication slot. Simultaneously, the tag processing device operates to receive advert broadcast messages transmitted by other tags and use received advert broadcast messages to determine if a conflict exists. If no conflict exists, transmission can occur via the selected communication slot. Otherwise conflict resolution is typically performed, for example by having each advert broadcast message seeded with a random number, with the tag having the highest number communicate, and other tags communicate in subsequent cycles.

It will therefore be appreciated that the above arrangement allows the location beacons to operate to provide two-way communication channels with the tags. This enables communication with remote devices, such as computer systems or similar, without requiring that the devices communicate directly with the tags. This is particularly useful as this allows the system to be utilised without requiring client devices local to the tags. For example, this allows remote computer systems to communicate with the tags via back-end channels provided by the location beacons, without requiring additional local infrastructure and without requiring the tags to be provided with network access.

Upon determining a location, the tag processing device is configured to compare the tag location to location restrictions defined in the object rules for the respective object, and then identify a trigger event if the tag location breaches or is likely to breach the location restrictions. Thus, for example, the object rules could define locations where the object 101 is permitted, with a trigger event being identified if the tag location falls outside the list of permitted tag locations, or is approaching a boundary of a permitted location. Conversely, the location restrictions could define locations where the object 101 is not allowed, with the trigger event being identified if the tag location moves into a location that is not permitted, or approaches a location where the tag is not permitted. A similar approach, using historical location information, could be used to determine tag movement, with this being used to determine if object movement, such as speed, falls within permitted or restricted ranges.

As mentioned above, each tag 110 periodically transmits a broadcast message indicative of at least an object type identifier of the associated object. This allows nearby tags 110 to identify other objects 101 within their vicinity. In particular, a tag 110 can determine a proximity of one or more other objects 101 using a broadcast message transmitted by one or more other tag 110 associated with one or more other objects. In this instance, the tag 110 can compare the proximity to proximity restrictions defined for pairs of objects 101 in the object rules, identifying the trigger event if the proximity breaches the proximity restrictions. Thus, for example, hydrogen and oxygen gas bottles may not be allowed to be stored within a set distance, such as ten metres, of each other. In this instance, if a first tag 110 on a hydrogen gas bottle detects a second tag 110 associated with an oxygen gas bottle, the hydrogen gas bottle will determine the proximity and determine if this is within the set distance specified in the object rules, if so triggering an action, such as generating an audible and/or visual alert.

Thus, it will be appreciated that the object rules for a first tag of a first object can be populated with rules defining set proximities to other objects, and that the tags of those other objects will have similar object rules defined in respect of the first object. Accordingly, as both tags 110 are transmitting broadcast messages, the other tag 110 will also determine the presence of the first tag 110 in proximity of the other tag 110, and perform a similar process, thereby also triggering an action. The proximity could be defined in terms of a set distance, and could also include a buffer zone in addition to the proximity, so that an alert can be generated when the buffer zone is reached, thereby alerting users that a proximity is about to be breached.

The proximity could be determined solely based on a transmission range of the tags, so that if a broadcast message is received, this indicates that the objects are within a defined proximity restriction. However, generally this is of only limited accuracy as transmission ranges of the tags 110 will vary depending environmental factors, such as the presence of obstructions, or the like. Accordingly, more typically the broadcast message is indicative of a tag location, in which case the first tag 110 uses the broadcast message received from the second tag 110 to determine the second tag location, determining the proximity of the second object 101 using the second tag location and the first tag location.

As previously mentioned, the broadcast messages may also include other context data allowing a similar approach to be used more broadly to establish a mutual context, with this being used to determine if the mutual context breaches mutual context rules. For example, the relative movement of two objects could be used to identify if the two objects are going to collide, allowing an action to be determined in the event that this is to occur.

It will be appreciated that in a similar manner a client device 120 can be used to detect the presence of tags 110 in the vicinity of the client device 120, by having the client device 120 receive the tag broadcast messages. This can facilitate the process of having a user find objects. For example, if the user needs to find a particular type of object, such as a gas bottle, the user can select an object type using a user interface presented on the client device 120. The client device 120 can then monitor for tag broadcast messages containing the object identifier corresponding to the selected type of object and generate a notification once this is received. This allows a user to traverse an area, with a notification being generated once the relevant object is within a transmission range of the client device 120. Additionally, as the tag broadcast message also typically includes a tag location, this can be used to display an indication of the location of the object to the user.

As previously mentioned, in addition to performing monitoring solely on the basis of the locations of the tags, the tags 110 can also make use of sensor data from at least one sensor to determine a measured parameter value. This can then be used to determine a trigger event, for example if the measured value breaches parameter value restrictions. Thus, for example, it may be a breach in compliance to store a gas bottle in an environment where the temperature exceeds a set temperature threshold. In this instance, the tag 110 can use temperature data received from a temperature sensor in order to determine a current environmental temperature. The tag 110 can compare this to a temperature threshold defined in the object rules, causing an alert to be generated if the temperature exceeds the threshold. It will be appreciated that the temperature threshold could additionally and/or alternatively form part of the stored context data. In this instance, the temperature could be a previously recorded temperature, so that if a certain temperature change is detected, an alert could be generated.

In one example, the tag 110 retrieves stored context data and determines a trigger depending on the stored context data. The stored context data can be used to store any form of context data, such as previous sensor readings, previous trigger events that have been identified, previous actions that have been performed, previous input commands received or the like. This enables the tag 110 to maintain a historical record, which in turn can allow more complex behaviour to be implemented. For example, this could be used in order to determine a length of time for which a temperature has been above a threshold, thereby allowing an alert to be triggered in the event that a temperature or other parameter exceeds a threshold for a set time period. This could also be used to monitor cumulative thresholds, such as a cumulative exposure to ionising radiation.

Additionally, context data could be updated in accordance with user input commands, received from a client device 120 using a client device message. This could be performed for example to allow details of maintenance performed on the object 101 to be recorded. It will be appreciated that this can therefore be used in conjunction with stored context data to monitor a time period between maintenance actions to ensure a maintenance schedule is met.

Once a trigger event has been detected, the tag processing device is typically configured to determine an action associated with the trigger event and then cause an action to be performed. Whilst a wide range of different actions could be implemented using the system, in a preferred example, the action includes one or both of tag based or non-tag based actions. Examples of tag based actions include using a tag 110 output device to generate a notification, such as using an audio output device, such as a speaker, to generate one or more sounds or spoken phrases, or using a light source to generate a visible indication. Additionally, the output device could be adapted to partially control equipment or the object, for example using a signal generator to generate a control signal, which can applied to a suitable control signal input of the equipment or object.

Non-tag based actions can be triggered by transferring an action message to a remote device, such as the client device 120. In this instance, the client device 120 can be responsive to the action message to generate a notification, such as an audible or visual indication, perform an action, such as forwarding the action message to a defined destination, such as an email address, SMS address, or a third party processing system, or causing an event log to be updated. It will be appreciated that through passing of messages to further external devices, this can be used to trigger any form of automated or manual process, for example instructing a number of maintenance staff that maintenance needs to be performed on a particular device. In this regard, if the client device 120 is able to forward a message to any processing system, the message can be routed to maintenance staff irrespective or not of whether they are in the vicinity of the tag 110, and/or have access to a client device 120 themselves.

In one example, the client device 120 is adapted to compare an action message to action settings and then selectively perform an action in accordance with the action settings. In this regard, it will be appreciated that in an environment where there are a large number of tags 110, individuals may not wish or be required to respond to all notifications. In this instance, their client device 120 can be configured to block notifications based on local settings, including blocking specific types of messages or actions, or blocking actions or messages associated with particular object types. However, appropriate configuration could be used to still allow the client device 120 to forward action messages to a defined destination, as required, thereby ensuring the action is performed, but avoiding unnecessarily disturbing the user of the client device 120.

Additionally the tag 110 may be required to understand when an action has been completed, for example to update the stored context data, and prevent duplication of actions by multiple client devices 120. In this instance, a client device 120 performing an action typically determines a tag identifier from the received action message, generates a confirmation message, and transfers the confirmation message to the tag 110 in accordance with the tag identifier, allowing the tag 110 to update context data, for example to reflect that the action has been performed, has commenced or is in progress.

It will be appreciated from this that each tag 110 can have a respective identifier, which is unique to the respective tag 110, allowing messages to be directed to the tag. In this instance, the confirmation message will typically be broadcast to any tags 110 in the vicinity of the client device 120, with tags 110 ignoring messages including a tag identifier corresponding to a different tag 110. This allows two-way communication to be established between a client device 120 and tag 110, without requiring a Bluetooth pairing process to be performed. This avoids the need for users to pair their client device 120 with multiple tags in order for the system to operate.

It will be appreciated from the above that a wide range of different actions can be performed, and that consequently the actions can be used for a wide range of applications. For example, in the context of compliance monitoring, typical actions include alerting users to a rule breach, recording details of rule breaches for logging purposes, notifying users of required actions associated with objects, such as required maintenance or the like, implementing safety overrides, such as deactivating objects 101 or equipment, or the like.

However, this is not essential and the system could be used in a wide range of other applications. For example, actions could include causing a transaction to be performed. An example of this is in the context of delivery of objects to a defined destination. In this instance, tags 110 attached to the objects could be pre-programmed, using suitable object rules, to identify when a destination location is reached, either based on the location of the tag, or based on the proximity to a destination tag. In this instance, once the destination location is reached, the action could include notifying devices that the destination has been reached, and optionally triggering a transaction, such as completion of a delivery order, payment for the delivery, completion of a delivery contract, or the like.

The above described processes rely at least to some extent on tags 110 being able to communicate with other tags 110 and with client devices 120. As such communication can be energy intensive, in one preferred example, the tags 110 repeatedly transmit broadcast messages separated by a transmission interval. Such transmission is typically trivial from an energy usage perspective, and hence this could be repeated constantly with a relatively high frequency, such as every second. In contrast, listening for messages such as location, tag, or client device messages, and then processing these as required, is typically more energy intensive.

Accordingly, the system is typically configured to repeatedly listen for messages over listening interval that is greater than the transmission interval, with this being interspersed with time periods in which the tag is in a low-power sleep mode, in which listening does not occur. Configuring the system so that the listen interval is longer than the transmission interval ensures that tag messages from other tags will be received each time the tag wakes. For example, if tags 110 transmit with a defined transmission interval such as one second, then listening for a message over a two second listening interval will ensure that at least one broadcast message transmitted by any other tag 110 that is within range will be received.

In this example, the tag 110 typically wakes from a sleep mode periodically, such as every minute, every two minutes, every ten minutes or every fifteen minutes, or the like, depending on relevant settings, or in response to detection of movement, for example based on signals from a movement sensor, such an accelerometer. In this regard, waking on movement is particularly beneficial as location restrictions will typically arise primarily when an object is being moved. Upon waking, the tag processing device listens for a message, determines if a trigger event has occurred and then returns to the sleep mode if this has not happened, thereby conserving power.

In order to upload object rules to a tag, the client device typically needs to determine a tag identifier associated with a tag. This can be achieved in any one of a number of ways, such as obtaining tag identifiers from tags within range of the client device to allow a user to select a tag identifier, based on user input commands for example by having a user manually input a tag identifier, or by scanning coded data, such as a QR code or similar displayed on the tag. Having determined a tag identifier, the client device will then determine available object types in accordance with user input commands, for example by displaying a list of object types obtained from object rules and then determining selection of one or more of the listed object types. Once an object type has been determined, rules can be retrieved for the respective object type from the rules repository, with these then being uploaded to the tag in accordance with the tag identifier.

The object rules can be generated in any suitable manner. In one example, this includes using a rules engine to at least partially automate the task. The rules engine typically operates by receiving a rules document, and parsing using natural language processing, to identify logic expressions and object types. An object identifier is then determined for each object type, either by retrieving these based on an object type of the object or by generating these as needed. The logic expressions are then used to generate the object rules by converting the logic expressions into a trigger event and an action, before uploading these to the tag. For example, the logic expressions are often specified within a rules text in terms of "If . . . then . . . " statements, which can be converted to a trigger and action. This can be performed using templates, for example by populating a template using text from the "If . . . then . . . " statements, so that the rules are generated in a standard manner, allowing these to be interpreted consistently by the tags.

A specific example of an object monitoring system will now be described in more detail with reference to FIGS. 3 to 6.

In this example, the tracking system includes a plurality of tags 310, which in use are attached to objects (not shown). A number of client devices 320 are provided, with some of these being in communication with the tags 310. A processing system 330, such as one or more servers, is provided in communication with the client devices 320 via one or more communications networks 340.

It will be appreciated that the configuration of the networks 340 are for the purpose of example only, and in practice the client devices 320 and the processing system 330 can communicate via any appropriate mechanism, such as via wired or wireless connections, including, but not limited to mobile networks, private networks, such as an 802.11 networks, the Internet, LANs, WANs, or the like, as well as via direct or point-to-point connections, such as Bluetooth, or the like. Typically, the client devices 320 are configured to communicate with the tags 310 using a short-range communication protocol, such as BLE, or the like.

A number of location beacons 360 are also typically provided, distributed throughout the location in which the tags 310 are used, with the location beacons being adapted to transmit location messages via the same short-range communication protocol.

Whilst the processing system 330 is shown as a single entity, it will be appreciated that in practice the processing system 330 can be distributed over a number of geographically separate locations, for example as part of a cloud-based environment. However, the above described arrangement is not essential and other suitable configurations could be used.

Figure 4:
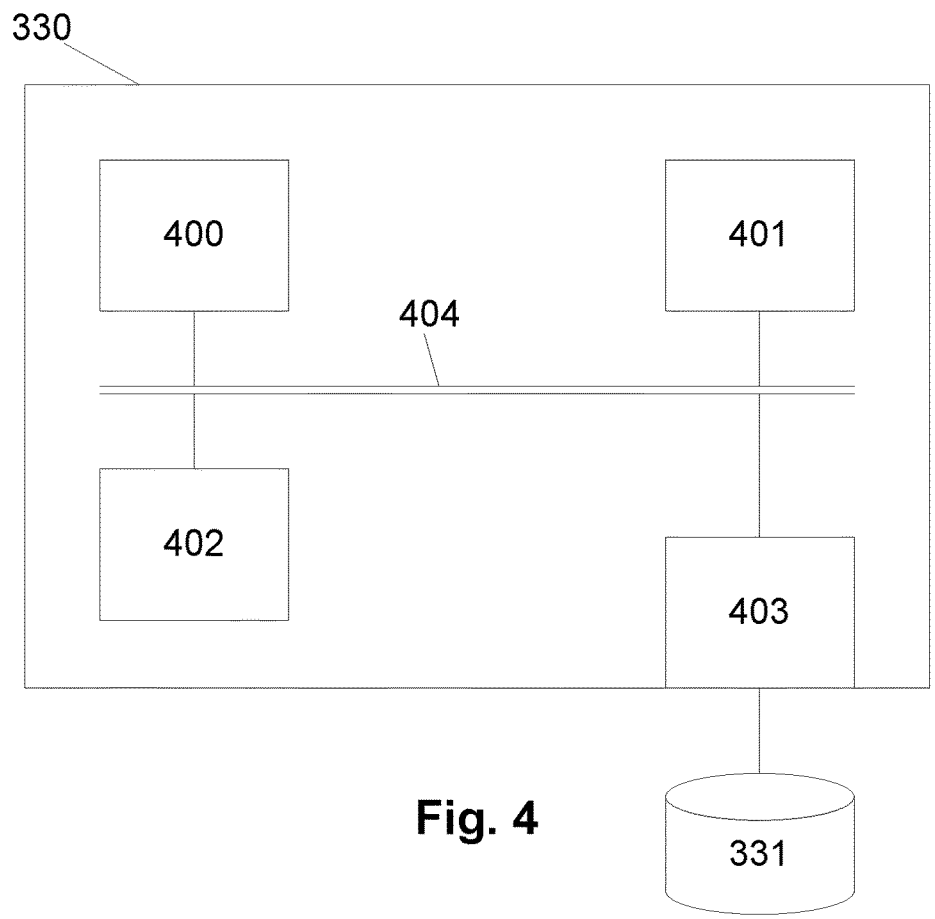
FIG. 4 is as schematic diagram of an example of a processing system.

An example of a suitable processing system 330 is shown in FIG. 4. In this example, the processing system 330 includes at least one microprocessor 400, a memory 401, an optional input/output device 402, such as a keyboard and/or display, and an external interface 403, interconnected via a bus 404 as shown. In this example the external interface 403 can be utilised for connecting the processing system 330 to peripheral devices, such as the communications networks 340, databases, other storage devices, or the like. Although a single external interface 403 is shown, this is for the purpose of example only, and in practice multiple interfaces using various methods (e.g. Ethernet, serial, USB, wireless or the like) may be provided.

In use, the microprocessor 400 executes instructions in the form of applications software stored in the memory 401 to allow the required processes to be performed. The applications software may include one or more software modules, and may be executed in a suitable execution environment, such as an operating system environment, or the like.

Accordingly, it will be appreciated that the processing system 330 may be formed from any suitable processing system, such as a suitably programmed client device, PC, web server, network server, or the like. In one particular example, the processing system 330 is a standard processing system such as an Intel Architecture based processing system, which executes software applications stored on non-volatile (e.g., hard disk) storage, although this is not essential. However, it will also be understood that the processing system could be any electronic processing device such as a microprocessor, microchip processor, logic gate configuration, firmware optionally associated with implementing logic such as an FPGA (Field Programmable Gate Array), or any other electronic device, system or arrangement.

Figure 5:
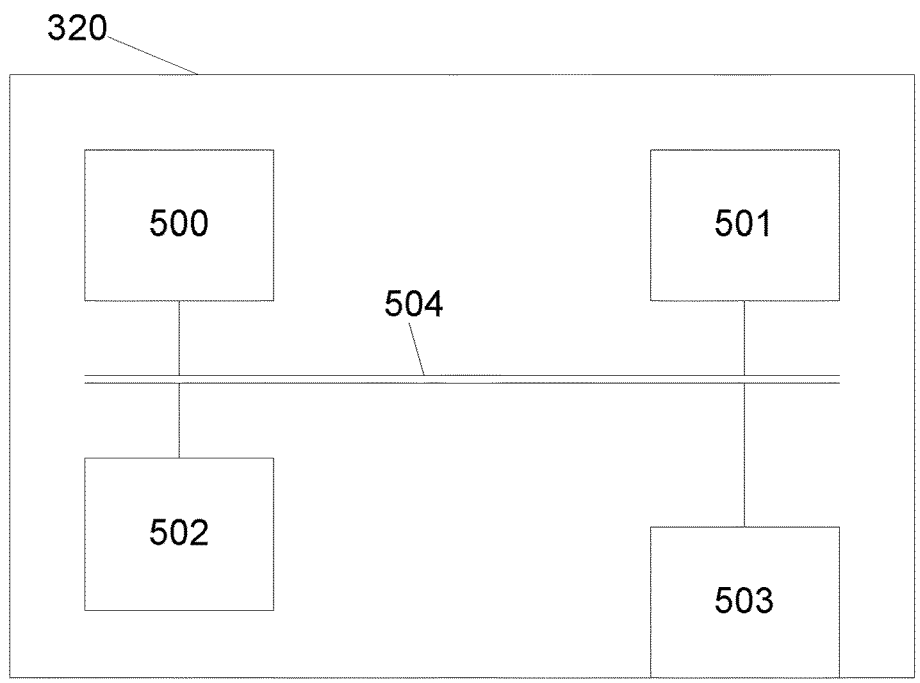
FIG. 5 is a schematic diagram of an example of a client device.

As shown in FIG. 5, in one example, the client device 320 includes at least one microprocessor 500, a memory 501, an input/output device 502, such as a keyboard and/or display, and an external interface 503, interconnected via a bus 504 as shown. In this example the external interface 503 can be utilised for connecting the client device 320 to peripheral devices, such as the tags 310, the communications networks 340, databases, other storage devices, or the like. Although a single external interface 503 is shown, this is for the purpose of example only, and in practice multiple interfaces using various methods (e.g. Ethernet, serial, USB, wireless or the like) may be provided.

In use, the microprocessor 500 executes instructions in the form of applications software stored in the memory 501 to allow for communication with the tags 310, the processing systems 330, as well as to allow user interaction for example through a suitable user interface.

Accordingly, it will be appreciated that the client devices 320 may be formed from any suitable processing system, such as a suitably programmed PC, Internet terminal, laptop, or hand-held PC, and in one preferred example is either a tablet, or smart phone, or the like. Thus, in one example, the client device 320 is a standard processing system such as an Intel Architecture based processing system, which executes software applications stored on non-volatile (e.g., hard disk) storage, although this is not essential. However, it will also be understood that the client devices 320 can be any electronic processing device such as a microprocessor, microchip processor, logic gate configuration, firmware optionally associated with implementing logic such as an FPGA (Field Programmable Gate Array), or any other electronic device, system or arrangement.

For the purpose of the following examples, it is assumed that one or more processing systems 330 are servers, which communicate with the client devices 320 via a communications network, or the like, depending on the particular network infrastructure available. The servers 330 typically execute applications software for performing required tasks including storing, searching and processing of data, with actions performed by the servers 330 being performed by the processor 400 in accordance with instructions stored as applications software in the memory 401 and/or input commands received from a user via the I/O device 402, or commands received from the client device 320.

It will also be assumed that the user interacts with the client device 320 via a GUI (Graphical User Interface), or the like presented on a display of the client device 320, and in one particular example via a browser application that displays webpages, or an App that displays relevant information. Actions performed by the client devices 320 are performed by the processor 500 in accordance with instructions stored as applications software in the memory 501 and/or input commands received from a user via the I/O device 502.

However, it will be appreciated that the above described configuration assumed for the purpose of the following examples is not essential, and numerous other configurations may be used. It will also be appreciated that the partitioning of functionality between the client devices 320, and the servers 330 may vary, depending on the particular implementation.

Figure 6:
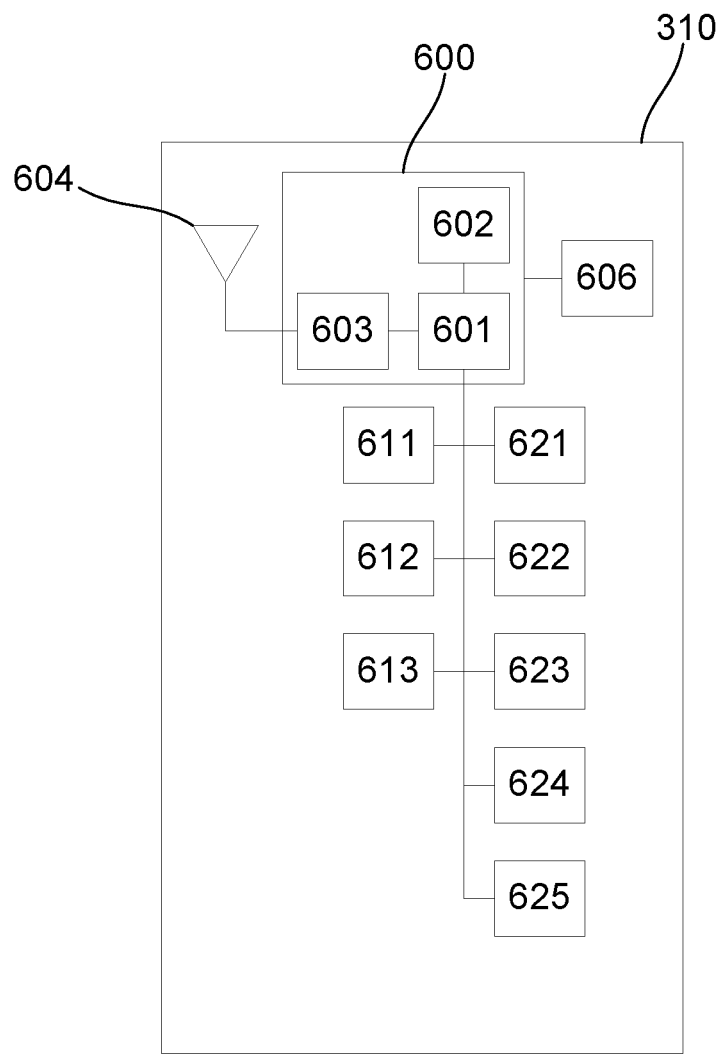
FIG. 6 is a schematic diagram of an example of a tag.

An example of a tag will now be described in more detail with reference to FIG. 6.

In this example, the tag 310 includes a power supply 606, a tag memory 602 that stores the object rules, a tag transceiver 603 that transmits or receives messages via an antenna 604, and a tag processing device 601 that identifies trigger events and causes the actions to be performed.

The nature of the tag and in particular the physical form factor of the tag, as well as the components used, can vary depending on the preferred implementation. For example, when the tag 310 utilises a short-range wireless communications protocol, such as BLE, whilst the processing device 601 and transceiver 603 can be formed from a custom integrated circuit, such as a Bluetooth system on a chip (SOC), coupled to, or including an integrated antenna 604 and other optional components, such as the memory 602.

In one example, the processing device 601 executes applications software allowing desired processes to be performed. In one example, this can include implementing a scheduler, in order to control activities implemented by the tag, such as switching between awake and sleep modes, generating messages, or the like, whilst a virtual machine can be used to execute object rule code that embodies the respective object rules for the tag.

The power supply 606 is typically adapted to provide power to the transceiver 603 and processing device 601 allowing the tag 310 to communicate with the client device 320 and other tags 310. Whilst any appropriate power supply can be used, in one example the power supply is the form of "AAA" or button cell battery having a minimal volume form factor, allowing the tag to be manufactured with small physical dimensions. This enables the tag 310 to be easily and unobtrusively attached to or otherwise physically associated with objects. It will also be appreciated that in some circumstances, the power supply can include power generating components, such as a solar panel, or the like.

The tag 310 may also typically include one or more output devices, such as a speaker 611, LED 612 and signal generator 613, although other displays could be provided such as OLED displays, e-Ink displays, or the like. Similarly, one or more sensors, can be provided such as a temperature sensor 621, humidity sensor 622, pressure sensor 623, light sensor 624, movement sensor 625, or the like.

The tags 310 can be configured to communicate with client devices 320, each other, and the processing system 330, either directly, via the communication networks 340, the client device 320 and/or the location beacons 360, depending on the situation.

Figure 7:
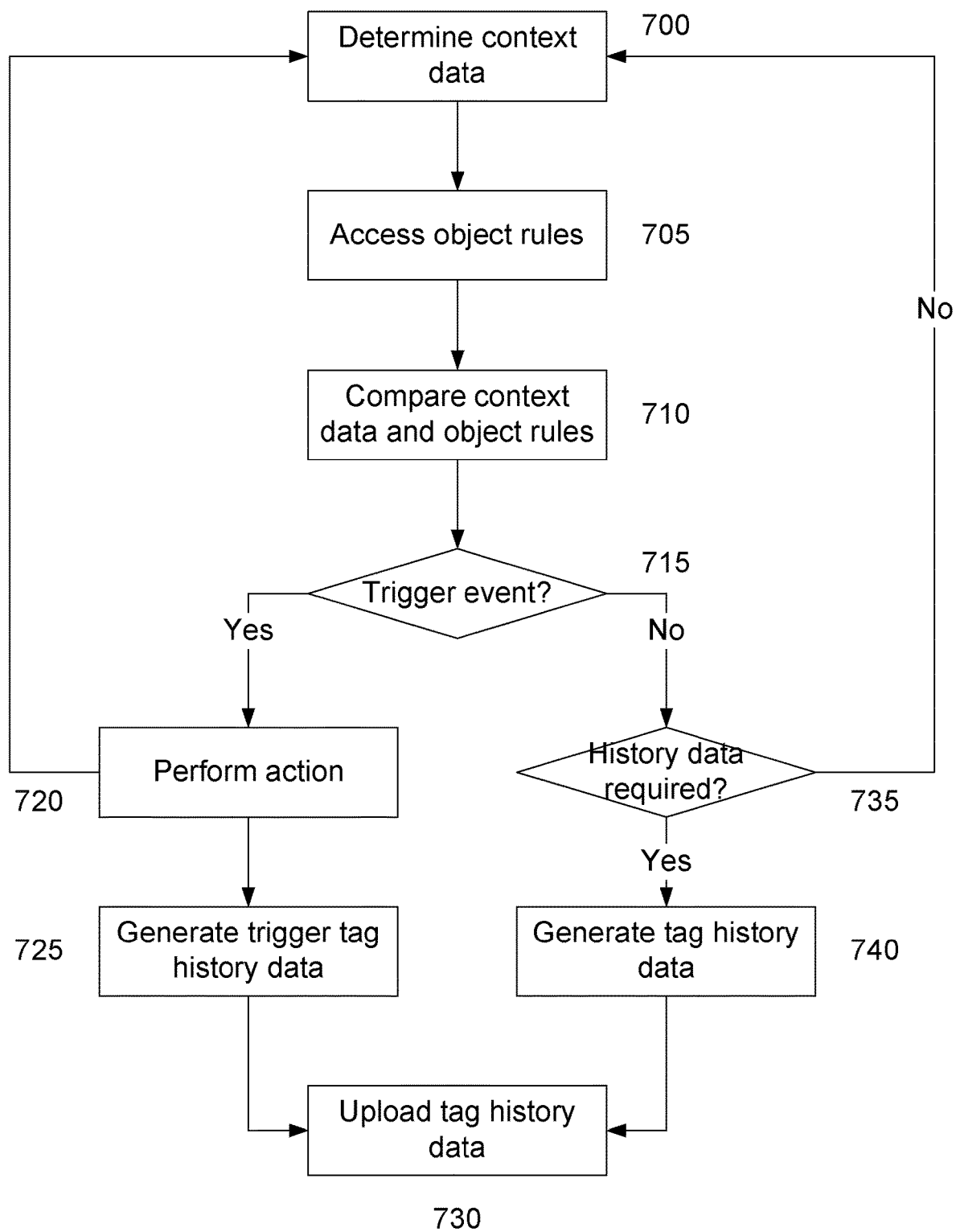
FIG. 7 is a flow chart of an example of a process for generating tag history data.

An example of operation of a tag to generate tag history data will now be described with reference to FIG. 7.

In this example, at step 700, the tag will determine context data. This process is typically performed on a periodic basis, such as when the tag wakes from a sleep mode, or in response to a received broadcast message, such as a tag or location broadcast message, or in response to signals from a sensor, or the like. The context data can be retrieved from memory, or could be derived from received messages and/or sensor signals, in which case the context data would also typically be stored in tag memory 602.

At step 705, the tag processing device 601 accesses object rules stored in the tag memory 602 and compares the context data to the object rules at step 710. The exact manner in which this is achieved will vary depending on the preferred implementation and a specific example of this will be described in more detail below.

At step 715, the tag processing device 601 determines if a trigger event has occurred and if so, performs any required action associated with the trigger event at step 720. The tag processing device 601 can then return to step 700 to monitor for further context data. Simultaneously the tag processing device 601 can generate trigger tag history data. This is typically achieved by retrieving context data for a predetermined time period, such as the proceeding 10-15 seconds, or the like, and then using this to generate a feature vector including an object type identifier, at least some of the context data, and an indication of the trigger event at step 725. The trigger tag history data is then uploaded to the processing system 330 at step 730 allowing this to be used in generating a predictive model, as will be described below.

In the event that a trigger event is not detected, then at step 735 the tag processing device 601 determines if tag history data is required. The need to upload tag data may vary depending on preferred implementation. In this regard, tag history data can be uploaded allowing the processing system 330 to predict a trigger event, although as will be described in more detail below, this may not be required if predictive object rules have been created. Even if tag history data is to be uploaded, this may only happen periodically, such as every minute, depending on the preferred implementation.

In the event uploading is not required, the process can simply return to step 700 to await further context data. Otherwise, the process proceeds to step 740 to allow the tag processing device 601 to generate tag history data. This again typically achieved by retrieving context data for a predetermined time period, such as the proceeding 10-15 seconds, or the like, and then using this to generate a feature vector including an object type identifier and at least some of context data from the respective time period. The tag history data is then uploaded to the processing system 330 at step 730 allowing this to be used in predicting trigger events.

Figure 8:
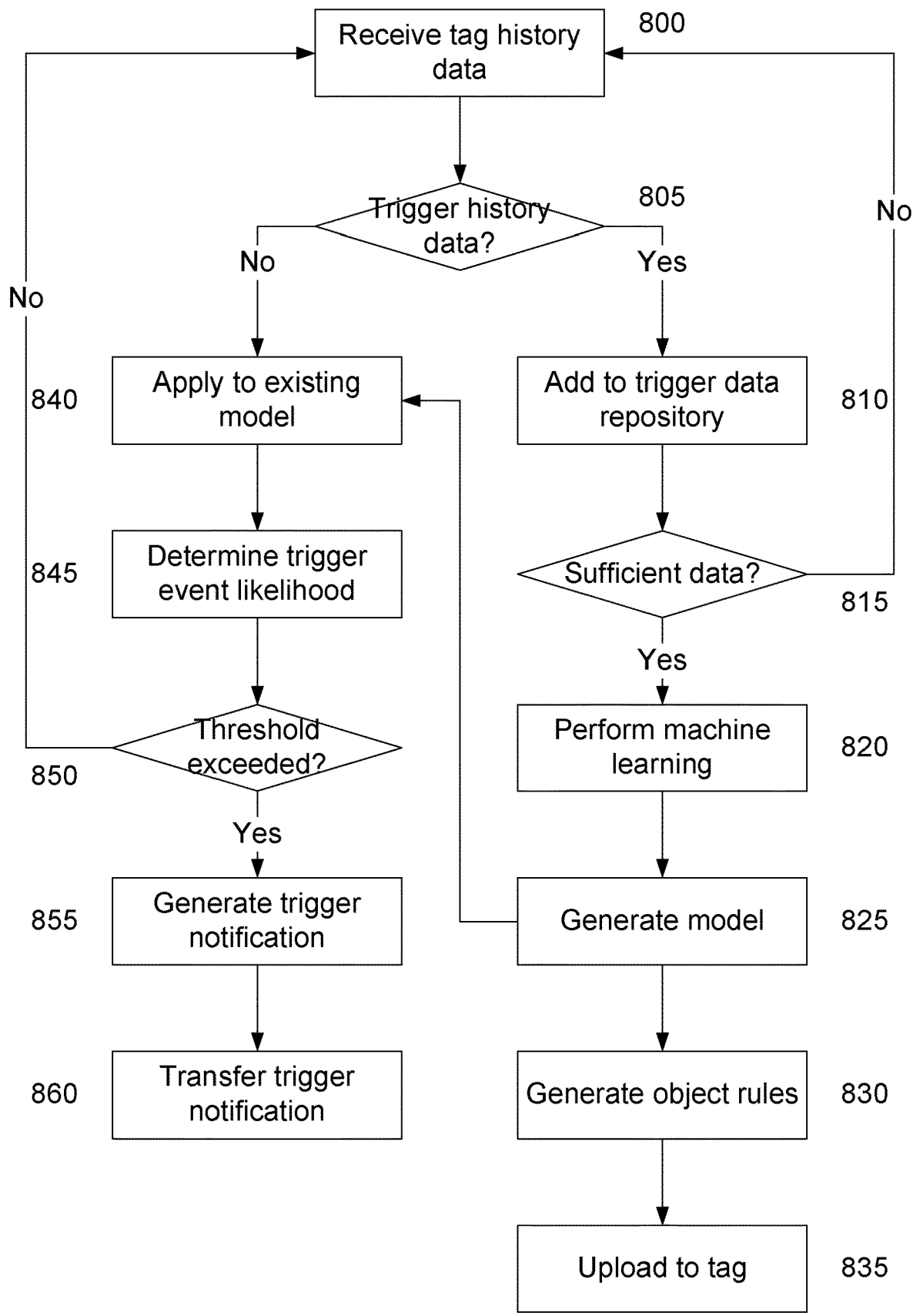
FIG. 8 is a flow chart of an example of a process for generating analysing tag history data.

An example of a process for using the above described system to analyse tag history data to generate a predictive model and/or predict trigger events will now be described with reference to FIG. 8.

In this example, at step 800 tag history data is received by the processing system 330. The tag history data can be generated by the tag 310 periodically and/or in response to detection of a trigger event, depending on the current situation, and may be transmitted to the processing system via a client device 320, location beacon 360, or communication network 340, depending on connection availability and/or the preferred implementation.

At step 805, the processing system 330 assesses if the tag history data relates to a trigger event, and hence is trigger tag history data. This could be indicated in the received tag history data, or could be determined by comparing context data from the tag history data to object rules.

In the event that the tag history data relates to a trigger event, then at step 810, the trigger data is added to a repository of trigger tag history data. Specifically, the repository, which could be a database or other data store, is used to collected trigger tag history data relating to trigger events, allowing this to be analysed so as to identify patterns in context data leading to trigger events occurring.

At step 815, the processing system 330 assesses whether there is sufficient trigger tag history data to perform the analysis. Respective analysis is typically performed for different trigger events, so this may require that a trigger event has occurred a number of times before the analysis can occur. Furthermore, it will be appreciated that analysis would typically need to be performed on a particular type of trigger event for a given object type, at a particular location, so multiple trigger events of a given type would need to occur at a location before the analysis can occur.

If insufficient data is available, the process can simply return to step 800, awaiting for further trigger tag history data.

Otherwise, once sufficient trigger tag history data is available for analysis to be performed, then at step 820 a machine learning process is performed in order to analyse the trigger tag history data. The nature of the analysis will vary depending on the preferred implementation, but in general will involve training a generic computational model with a subset of the trigger tag history data, and then testing the model with the remaining trigger tag history data in order to validate the model. Specifically, in one example, trigger tag history data from the subset is used to train one or more generic computational models, to enable the models to determine a likelihood of a trigger event occurring given a feature vector of tag history data. The models are tested against the remaining data, and optionally refined iteratively until the model is able to predict trigger events with a sufficiently high discriminatory ability. This results in a model that reflects relationships between the trigger tag history data and trigger events and can be used to determine a likelihood that a particular set of tag history data would result in a trigger event subsequently occurring.

Once the model has been generated at step 825, this can be stored for later use, and optionally can be used to generate predictive object rules at step 830. Specifically, the predictive object rules are rules that embody the relationships, so that the predictive object rules can be used to predict when an object rule breach might arise based on tag history data. The predictive object rules can be uploaded to tags at step 835 and processed as per normal object rules, to allow a trigger event to be predicted locally on the tag. This can in turn be used to performed an action such generating an alert or notification prior to a trigger event occurring, with a view to preventing the breach occurring.

In another mode of operation, the processing system 330 can be used to analyse received tag history data that does not relate to a trigger event, and use this to predict if a trigger event is likely to occur, thereby avoiding the need for predictive object rules, which can be difficult to create.

In this example, at step 840, received tag history data is applied to the predictive model, with the predictive model generating an output in the form of a likelihood that a trigger event is to occur at step 845. The likelihood can be compared to a threshold and if this is exceeded at step 850, meaning a trigger event is likely, a notification can be generated at step 855 and transferred at step 860, either to a client device 320, or a tag 310, allowing an action to be performed, such as generating an alert or similar, or allowing machinery or other equipment, such as AGV (automated guided vehicle) to be controlled or similar. It will be appreciated that this in turn can prevent trigger events occurring, and hence can be used to help prevent rule breaches or similar in a predictive manner.

In particular the above described approach allows patterns of behaviour leading to rule breaches to be analysed using machine learning techniques, with this being used to prevent similar rule breaches occurring in future. It will also be appreciated that this can be applied to other scenarios and is not limited to predicting rule breaches.

Figure 9:
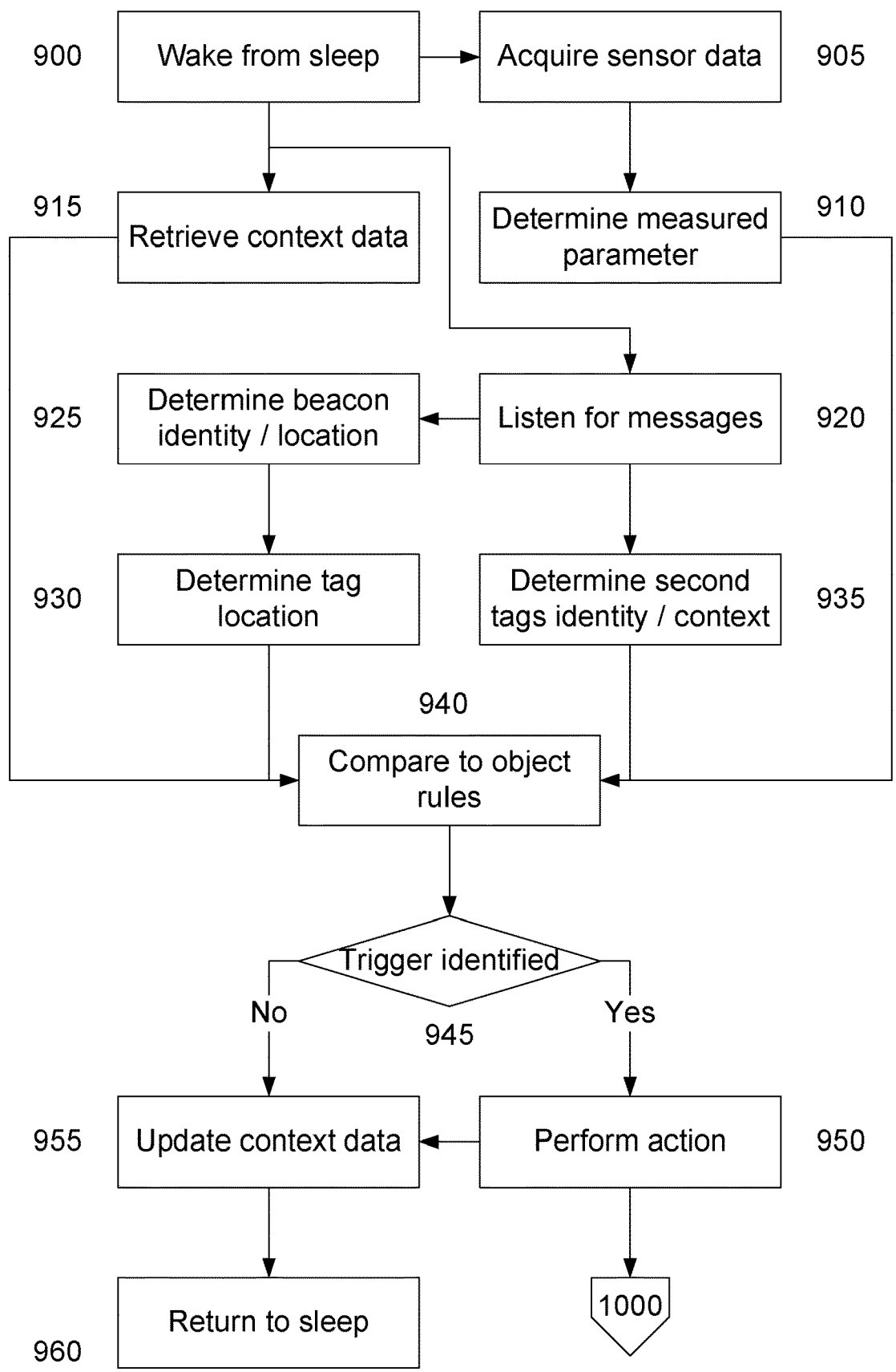
FIG. 9 is a flow chart of an example of a process for identifying a trigger.

An example of a process for identifying a trigger event will now be described with reference to FIG. 9.

In this example, at step 900, the tag 310 wakes from sleep, either in accordance with a defined schedule, or upon detection of movement by the movement sensor 625. In simultaneous processes, the tag 310 will typically acquire sensor data at step 905, retrieve context data at step 915 and listen for messages at step 920. In this regard, sensor data acquired at step 905 is used to determine a measured parameter at step 910, such as a current temperature, humidity, air pressure, or the like. If messages are received at step 920, these typically include a location broadcast message, in which case the process involves determining a beacon identity and location from the location broadcast message at step 925, with this being used to determine a tag location at step 930. In the event that the message is a broadcast message from another tag, this is used to determine a second tag 310 identity and location, or other context, at step 935.

At step 940, each of the above determined context data, including the measured parameters, retrieved context data, current tag location and object identifier and context of other tags, are compared to the object rules, allowing one or more triggers to be identified at step 945. In this regard, the virtual machine implemented by the tag processing device 611 will execute each of the code snippets corresponding to the object rules for the tag, using the context data as variables, to thereby determine if the object rules are indicative of an event.

In this regard, it will be appreciated that analysing a range of different types of context data simultaneously, allows complex trigger events to be identified. For example, this could allow situations to be identified where an object is located within a set area, and is moving towards another object, and where an environmental parameter, such as a temperature, has been above a defined threshold for a defined time period. This in turn allows complex compliance or other object monitoring processes to be performed.

Figure 10:
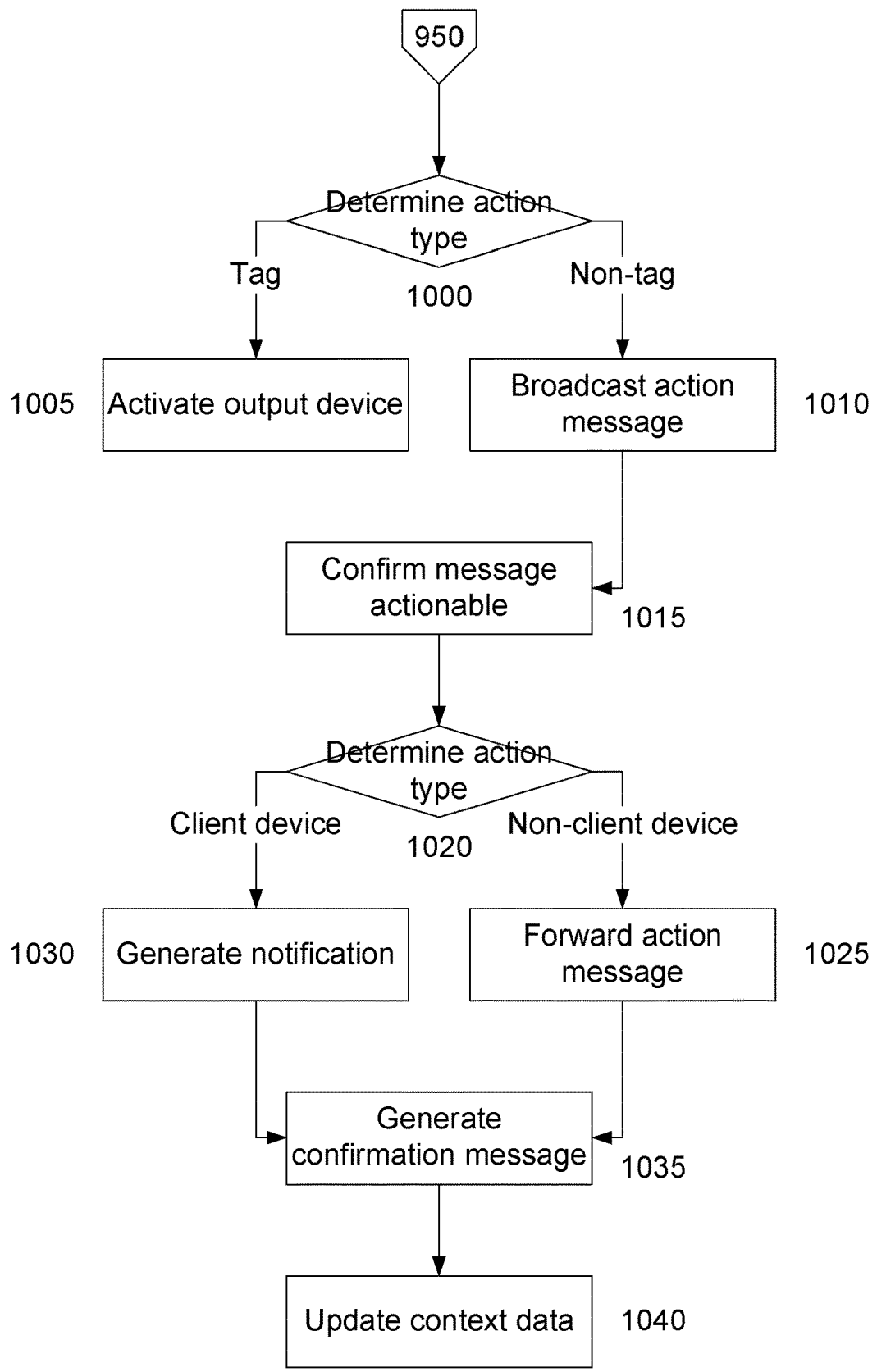
FIG. 10 is a flow chart of an example of a process for performing an action.
Figure 11:
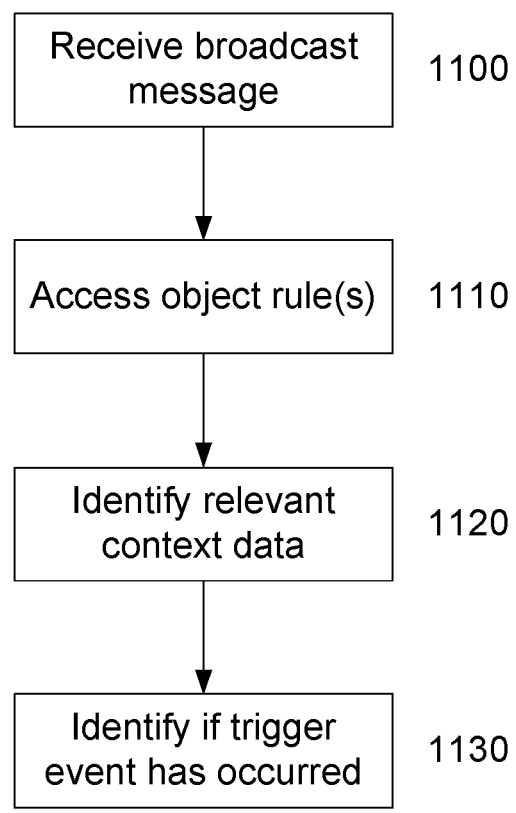
FIG. 11 is a flow chart of an example of a process for analysing tag broadcast messages.

If a trigger is identified at step 945, the process proceeds to step 950 to cause an action to be performed, with an example of the action process being described below with reference to FIG. 10.

Following this or otherwise, context data is typically updated at step 955, for example to log details of measured parameters, the proximity of or movement relative to other tags, the current tag location, details of any identified trigger events, or performed actions, before the tag 310 returns to a sleep mode at step 960. The process of steps 900 to 960 would then be repeated after a predetermined time delay, which can be set based on the energy requirements of the tag.

An example of the process for performing an action will now be described with reference to FIG. 10.

In this example, at step 1000, the tag 310 determines if the action is to be performed by the tag and/or by another device, such as the client device 320. In the event that the action is performed by the tag 310, the tag 310 typically activates one or more of the output devices 611, 612, 613, for example to generate an audible and/or visual indication, or generate a control signal, which is sent to the object or other equipment as required by the defined action.

Additionally and/or alternatively, the action can involve another device, in which case the tag 310 generates and broadcasts an action message at step 1010. The format and content of the action message will typically be defined in the object rules and this could include, for example, defining the format and content of the action message, a message destination, or the like. The action message can be transferred directly to a client device, or could alternatively be transferred to a client device via a location beacon 360.

In this latter case, the tag processing device 611 will select a transmission slot, and broadcast an advert broadcast messages indicative of the selected slot. The tag processing device 611 will receive any advert broadcast messages transmitted by other tags, and use this to determine if the selected slot is available for transmission. Assuming so, the tag processing device 611 waits for a location broadcast message to be transmitted by the location beacon, and then transits the action message in the respective communication slot. Otherwise, the tag processing device 611 selects a different slot and repeats the process until a slot is available. Upon receipt of an action message, the beacon will determine an intended destination and forward the action message accordingly.

Assuming the action message is received by a client device 320, at step 1015, the client device 320 would confirm if the message is actionable. In particular, this step involves checking whether there are any settings that preclude the message being actioned, for example if a user has configured their client device 320 to block notifications, or the like.

Following this, at step 1020, it is determined if the action is to be performed by the client device 320 and/or another device, such as the server 330. For example, at step 1030, the client device can generate a notification, such as a visual and/or audible alert, which can be presented to a user. Additionally, and/or alternatively, at step 1025 the client device 320 may forward the action message to another processing system, such as the server 330, which then performs the action as required.

In either case, a confirmation message can be generated by the client device 320 at step 1035, with this being provided to the tag based on a tag identifier included in the required action message, allowing the tag 310 to update the context data at step 1040, thereby reflecting that the action has been commenced and/or completed.

An example of a process for processing object rules will now be described in more detail with reference to FIGS. 11 and 12A to 12D.

Figure 12A:
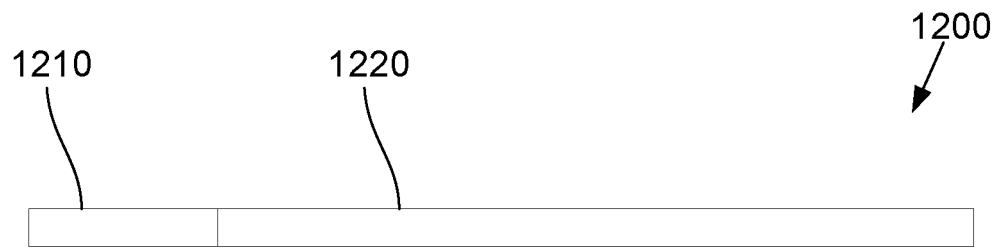
FIGS. 12A to 12D are schematic diagrams illustrative of tag broadcast messages; and, FIG. 13 is a flow chart of a specific example of a process for analysing tag broadcast messages.
Figure 12B:
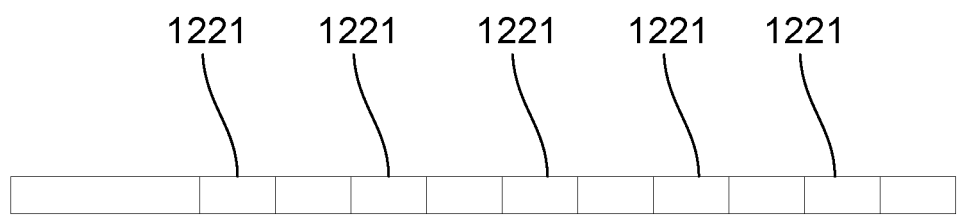

In this example, a tag 310 receives a broadcast message, such as a location broadcast message, tag broadcast message, or the like, at step 1100. An example of the format of a broadcast message is shown in FIG. 12A. In this example, the broadcast message 1200 includes a header 1210 and a payload 1220. In the case of a tag broadcast message, the header includes an object type identifier of the associated object, whilst the payload 1220 includes context data. As shown in FIG. 12B, the payload 1220 is typically segmented into a number of portions 1221, with respective context data being assigned to each portion 1221.

Figure 12C:
Figure 12D:

So for example, FIG. 12C represents a first data packet including location context data in portion 1221.1, and temperature sensor data in portion 1221.2. In contrast FIG. 12D represents a second data packet including location context data in portion 1221.1, and humidity sensor data in portion 1221.3. It will be appreciated that the exact nature of the context data is not important and the example is illustrative only.

It will be appreciated that different broadcast packets can have a different message format. So, for example, tag broadcast messages from a gas bottle will have a different message format to tag broadcast messages from an AGV. Similarly, location broadcast messages will also include a different format, and might for example include a location indication in the header of the data packet.

In any event, the data packets for specific object types have a given message format so that given context data is always included in a respective portion of the message and in particular the payload.

At step 1110, having received the broadcast message the tag processing device accesses a respective object rule. In this regard, each object rule is associated with a respective object type, so the tag processing device need only retrieve object rules corresponding to the object type identified by the object type identifier in the received broadcast message. The manner in which the object rule is accessed will depend on the nature of the rule and how these are implemented. For example, the object rule could be stored in the tag memory, in which case the object rule may be retrieved. Alternatively, object rules may be embodied in executable code running in a virtual machine in memory, in which case access will simply involve execution of the object rule.

In any event, at step 1120, the object rule is used to identify relevant context data. Specifically, the object rule will specify the portion of the broadcast message containing relevant context data that is required in order to process the object rule. So for example, if location and temperature context data are required, the object rule will identify portions 1221.1 and 1221.2, whereas if location and humidity context data is required, the object rule will identify portions 1221.1 and 1221.3.

Once the relevant context data is identified, this allows the object rule to be used to determine if a trigger event has occurred. Specifically, this allows the tag processing device to identify the trigger event using only the relevant sections of the context data, allowing other sections within the payload to be ignored. This vastly reduces the computational requirements in order to process and analyse context data.

Accordingly, in one broad form an object monitoring system can include a plurality of tags, each tag being associated with a respective object in use. The tags include a tag transceiver configured to transmit or receive messages and a tag processing device. The tag processing device is configured to receive a broadcast message from another tag associated with another object. The tag processing device accesses an object rule associated with the object type of the other object using the object type identifier obtained from the broadcast message and then uses the object rule to identify relevant context data in the broadcast message. The relevant context data and object rules are then used to identify if a trigger event has occurred and if so, determine an action associated with the trigger event allowing the action to be performed.

Figure 13:
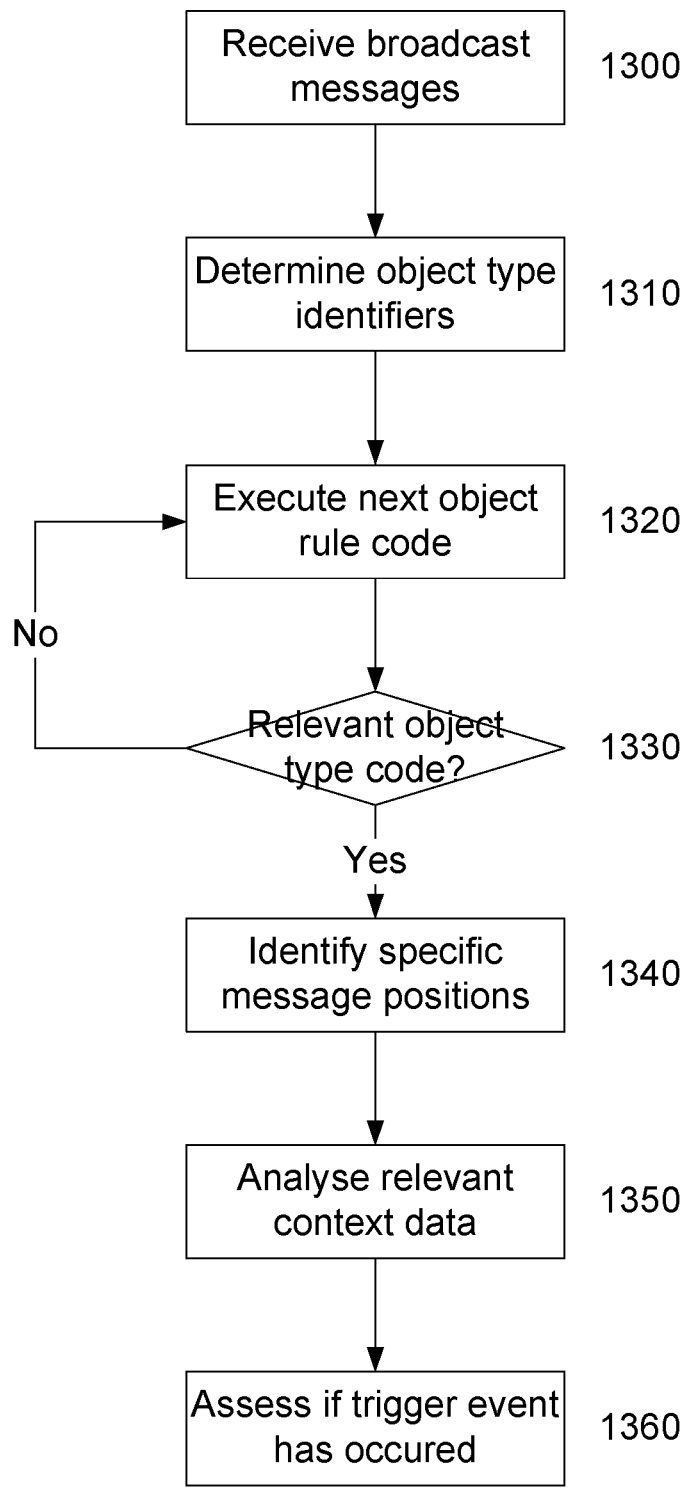

An example of the process of implementing an executable object rule will now be described in more detail with reference to FIG. 13.

In this example, a tag 310 receives broadcast messages, such as a location broadcast message, tag broadcast message, or the like, at step 1300 and determines object type identifiers at step 1310, for example obtaining these from broadcast message headers in a manner similar to that described above.

At step 1320 object rule code corresponding to a plurality of object code is executed. Typically object code in the form of executable code snippets for every loaded object rule will be executed in turn, with an initial stage of the execution involving an assessment of whether a relevant object type identified has been identified in one of the received broadcast rules at step 1330. If not, that respect rule snippet ceases execution and the process moves onto the next code snippet.

Otherwise, at step 1340, relevant positions in the respective broadcast message are identified at step 1340, with relevant context data from the specified locations being analysed at step 1350, allowing the tag processing device to assess if the respective object rule has been breached and a trigger event has occurred at step 1360.

Accordingly, the above described system provides mechanisms in order to allow tags 310 to be used to monitor objects, causing trigger events to be identified based on a context of the tag, with actions being taken as required.

Additionally, the above described system provides mechanisms in order to allow tags 310 to be used to monitor objects, causing trigger events to be identified based on a context of the tag, with actions being taken as required. Additionally, the system can be used to generate predictive models based on historical object behaviours, with such predictive models being used to predict when trigger events are likely to occur. This can in turn be used to take action in order to attempt to prevent trigger events.

Specifically, the system provides a tag that can be attached to an object that in one example has the ability to localise itself, either absolutely, approximately or relative to other objects, and has one or more compliance rules relevant to the attached object that is assessed in the locally derived context, including the location, defined exclusion zones for the object, proximity to certain types of objects, environmental conditions unfit for the object, time of day, or the like.

In one example, this can be used to determine if a compliance or other object rule has been breached and then perform a response to either indicate the breach, for example through notification such as a voice message detailing the breach to be actioned by an external party, or attempt to resolve the breach itself by effecting the object, such as having the tag control the object, disabling further movement of the object, such as shutting off power to a robot or vehicle, or the like.

In one example, the tag is aware of the type of object with which it is associated, and is able to advertise this information, optionally together with additional information, such as a location, range, or the like. The nature of the relevant object is then used to access object rules embodying complex legal or other compliance documents and frameworks, which can be transformed into a set of programmatically represented object rules, typically in the form of conditional statements that define triggers and associated actions. This allows the tag to be able to substantially continuously assess object rules using locally derived context information to detect a breach of one or more rules and hence perform one or more associated actions specific to the rule(s) being breached.

This can enable complex behaviours to be embodied within the rules, with the triggers being identified based on contextual information relating to the object, and other objects within the environment. For example, if the tag is assigned to a $H_2$ gas bottle, a rule can be defined that causes the tag to assess its own location and a location of any nearby $O_2$ gas bottles. If the rule is evaluated and a proximity restriction breached, then the rule will trigger a corresponding action, such as announcing using text to speech or pre-recorded speech, or displaying a visual indicator, that this object has breached the rule and an action needs to be taken.

This system can be applied to robotic applications; one example of this being giving the telepresence the ability to be able to localise itself and have one or more rules relating to breach of compliance based on proximity to other tags and/or locations. The tag could use map data in conjunction with components of rules and the rules that programmatically represent compliance, such as location, conditions relative to other objects, exclusion zones, floor maps, etc. These rules and compliances may be preloaded, dynamically loaded, or provided in near-real time by direct peer-to-peer communication with the tag. These give the robot the unique ability to understand that it may be in an area that it is not allowed and take appropriate action to deal with the situation, such as halting power to the robot so it remains there until someone comes and takes it out of the area.

In another example, equipment, such as a vehicle, tool, or the like, could be equipped with a tag defining rules regarding operating requirements associated with the equipment. The operating requirement could define exclusion zones around the equipment, information regarding authorised operators, or the like. In this instance, authorised operators could be provided with tags that provide permission for the user to use the machine. In the event that non-authorised users are detected within a defined proximity of the equipment, an alarm or notification could be generated.

Accordingly, the above described system enables low power cheap tags to be used to perform real-time in situ compliance checking and actioning by utilising a low power localisation engine and augmenting this with a compliance rule set specific to an object. The tag is in essence self-aware in that it knows what object it is attached to and thus is able to use the subset of compliance rule(s) that correspond to the object. Additionally, the device advertises properties of the object it is attached to so that tags associated with other objects can assess their rules in relation to the object.

The system can be used broadly for regulation technology applications in that it can notify when a breach of compliance policy occurs such as an object, including people, being in a restricted area, or relative to another certain type of object, plus the many other variations based on policy documents. However, numerous applications of general condition checking exist, such as providing notifications when immunodeficiency patients in an hospital are in too close of proximity, livestock venturing into restricted areas (i.e. outside of the designated paddocks), location-based sensor/kill switch if they enter an area they are not allowed in, staff who do not have qualification for using specific equipment or access to specific rooms.

In addition to being entirely reactive, responding to rule breaches, the system can also be combined with machine learning in order to identify patterns of behaviour that lead to rule breaches. These patterns can be used to predict when rule breaches are likely to occur, in turn allowing interventions to be performed, for example to alert users before the breach occurs, allowing the breach to be prevented.

In one broad form, the system can be used to generate predictive models based on historical object behaviours, with such predictive models being used to predict when trigger events are likely to occur. For example, this can use feature vectors based on historical context data leading to a trigger event, in order to generate predictive models, which can in turn allow recent context data for a tag to be used to predict a likelihood of a trigger event occurring. This can in turn be used to take action in order to attempt to prevent trigger events, which can in turn lead to improved compliance.

In another broad form, the above described system can employ a particular message formatting, allowing data processing requirements to be significantly reduced. Specifically, this system can employ a message format in which different types of context data for a specific object are always stored within given portions of a broadcast message so that context data relevant to a particular object rule can be more easily identified and processed. This allows a tag processing device to ignore the majority of received data, making it feasible for the tag to handle large volumes of broadcast data without requiring complex hardware.

In another broad form, the above described system can employ virtual objects in order to allow object rules to be updated, for example to allow rule parameters to be updated.

It will be appreciated that these broad forms can be employed collectively, but this is not essential and each of these could be implemented independently.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

What is claimed is:

1. An object monitoring system including:
   a) a plurality of tags, each tag being associated with a respective object in use and including:
      i) a tag transceiver configured to transmit or receive messages;
      ii) a tag processing device configured to:
         (1) determine context data indicative of a context associated with the object and/or other objects;
         (2) generate tag history data indicative of:
            (a) an object type identifier indicative of an object type of the respective object; and,
            (b) at least some context data for a time period; and,
         (3) upload tag history data to one or more monitoring processing devices; and,
   b) the one or more monitoring processing devices configured to:
      i) analyse tag history data so that results of the analysis can be used to predict trigger events; and,
      ii) generate a predictive model indicative of relationship between context data and one or more trigger events, the predictive model being usable to predict trigger events.

2. An object monitoring system according to claim 1, wherein the tag includes a tag memory configured to store object rules, and wherein the tag processing device is configured to:
   a) use context data and object rules to identify a trigger event; and,
   b) generate trigger tag history data in response to detection of the trigger event.

3. An object monitoring system according to claim 1, wherein the one or more monitoring processing devices are configured to:
   a) use tag history data and object rules to identify a trigger event; and,
   b) identify the trigger tag history data in response to detection of the trigger event.

4. An object monitoring system according to claim 1, wherein the one or more monitoring processing devices are configured to analyse trigger tag history data using machine learning techniques.

5. An object monitoring system according to claim 1, wherein the one or more monitoring processing devices are configured to generate a respective predictive model for each of a number of different trigger events.

6. An object monitoring system according to claim 1, wherein the tag history data is at least one of:
   a) a feature vector; and,
   b) used to derive a feature vector.

7. An object monitoring system according to claim 1, wherein the one or more monitoring processing devices are configured to use a predictive model and tag history data to predict a trigger event.

8. An object monitoring system according to claim 1, wherein the one or more monitoring processing devices are configured to:
   a) use a predictive model and tag history data to calculate a likelihood of a trigger event; and,
   b) selectively perform an action depending on the likelihood of the trigger event.

9. An object monitoring system according to claim 1, wherein the one or more monitoring processing devices are configured to generate a notification of a predicted trigger event.

10. An object monitoring system according to claim 1, wherein the one or more monitoring processing devices use a predictive model to generate one or more predictive object rules, and wherein the tag processing device is configured to use predictive object rules and context data over a time period to predict when a trigger event is likely to occur.

11. An object monitoring system according to claim 1, wherein the tag processing device determines the context data based on at least one of:
   a) one or more tag locations determined based on location tag broadcast messages received via the tag transceiver from one of a plurality of location beacons;
   b) one or more tag broadcast messages received from other tags associated with other objects; and,
   c) sensor data from one or more sensors; and,
   d) stored context data.

12. A system according to claim 1, wherein at least one of:
   a) the tag includes an object type identifier indicative of at least an object type of the associated objected; and,
   b) respective object rules are defined for one or more respective object types.

13. A system according to claim 1, wherein the tag processing device is configured to cause the tag transceiver to transmit a tag broadcast message including:
   a) an object type identifier indicative of at least an object type of the associated respective object;
   b) context data associated with the respective object; and,
   c) a data packet including:
      i) a packet header containing the object type identifier; and,
      ii) a payload containing the context data.

14. An object monitoring system according to claim 1, wherein, the tag processing device is configured to:
   a) receive one or more tag broadcast messages received from one or more other tags associated with one or more other objects;
   b) determine an object type of the one or more other objects using an object type identifier associated with each tag broadcast message; and,
   c) process at least some of the tag broadcast messages using an object rule associated with the respective object type.

15. An object monitoring system according to claim 1, wherein the tag processing device is configured to process at least one tag broadcast message by:
   a) accessing an object rule associated with an object type of the other object, wherein the object rule is indicative of a defined message format associated with the respective object type that specifies one or more portions of the tag broadcast message that contain relevant context data;
   b) using the object rule to identify relevant context data in the tag broadcast message; and,
   c) using the relevant context data and the object rule to identify if a trigger event has occurred.

16. A system according to claim 1, wherein object rules are stored in tag memory as code, and wherein:
   a) the tag processing device is configured to execute the code to identify if a trigger event has occurred;
   b) the code includes a plurality of code snippets, each snippet corresponding to a respective object rule; and,
   c) the tag processing device is configured to repeatedly execute the plurality of code snippets.

17. An object monitoring method including:
   a) providing a plurality of tags, each tag being associated with a respective object in use and including:
      i. a tag transceiver configured to transmit or receive messages;
      ii. a tag processing device;
   b. using the tag processing device to:
      i. determine context data indicative of a context associated with the object and/or other objects;
      ii. generate tag history data indicative of:
         1. An object type identifier indicative of an object type of the respective object; and,
         2. at least some context data for a time period; and,
      iii. upload tag history data to one or more monitoring processing devices; and,
   c. using the one or more monitoring processing devices to:
      i. analyse tag history data so that results of the analysis can be used to predict trigger events; and,
      ii. generate a predictive model indicative of relationship between context data and one or more trigger events, the predictive model being usable to predict trigger events.

* * * * *